US008157162B2

(12) United States Patent
Jönsson et al.

(10) Patent No.: US 8,157,162 B2

(45) Date of Patent: Apr. 17, 2012

(54) CASH DEPOSIT APPARATUS AND ASSOCIATED METHODS AND DEVICES

(75) Inventors: Manfred Jönsson, Staffanstorp (SE); Arne Skoog, Skurup (SE); Mårten Österberg, Malmö (SE); Per Lundin, Reston, VA (US)

(73) Assignee: Scan Coin AB, Malmo (SE)

( * ) Notice: Subject to any disclaimer, the term of this patent is extended or adjusted under 35 U.S.C. 154(b) by 1075 days.

(21) Appl. No.: 11/558,704

(22) Filed: Nov. 10, 2006

(65) Prior Publication Data

US 2007/0108267 A1 May 17, 2007

Related U.S. Application Data

(60) Provisional application No. 60/736,601, filed on Nov. 14, 2005.

(30) Foreign Application Priority Data

Nov. 11, 2005 (SE) ....................................... 0502492

(51) Int. Cl.
*G06Q 40/00* (2012.01)
*G07D 11/00* (2006.01)
*G07F 19/00* (2006.01)

(52) U.S. Cl. .......... 235/379; 235/380; 235/381; 235/383

(58) Field of Classification Search .................. 235/379, 235/380, 381, 383

See application file for complete search history.

(56) References Cited

U.S. PATENT DOCUMENTS 2,519,357 A 8/1950 Daugherty
2,646,805 A 7/1953 Anderson
3,147,839 A 9/1964 White, Jr.
3,196,887 A 7/1965 White, Jr.
3,828,166 A 8/1974 Johansson et al.
4,286,703 A 9/1981 Schuller et al.
4,355,369 A * 10/1982 Garvin .......................... 235/379
4,360,034 A 11/1982 Davila et al.
4,376,442 A 3/1983 Gomez et al.
4,383,540 A 5/1983 DeMeyer et al.
4,541,057 A 9/1985 Hagiwara
4,558,712 A 12/1985 Sentoku et al.
4,636,947 A 1/1987 Ward (Continued)

FOREIGN PATENT DOCUMENTS

CA 2 320 646 A1 6/2001

(Continued)

OTHER PUBLICATIONS

U.S. Appl. No. 60/782,747.*

(Continued)

*Primary Examiner* — Ali Sharifzada

(74) *Attorney, Agent, or Firm* — Womble Carlyle Sandridge & Rice LLP

(57) ABSTRACT

A cash deposit apparatus has a user interface module that provides a user interface at a first external side of the apparatus and allows a user to interact with a cash processing transaction of the apparatus. A cash processing module processes cash deposited by the user and determines a value related to the processed cash, and has a service interface for providing access to the cash processing module. A cash storage module stores cash as processed by the cash processing module and has a cash storage interface for providing access to the cash storage module. The cash processing module and the cash storage module are independently configurable.

29 Claims, 22 Drawing Sheets

U.S. PATENT DOCUMENTS

| | | | | |
|---|---|---|---|---|
| 4,733,765 | A | 3/1988 | Watanabe | |
| 4,744,468 | A | 5/1988 | Goi et al. | |
| 4,964,495 | A | 10/1990 | Rasmussen | |
| 4,988,849 | A | 1/1991 | Sasaki et al. | |
| 4,995,848 | A | 2/1991 | Goh | |
| 5,027,935 | A | 7/1991 | Berg et al. | |
| 5,302,811 | A | 4/1994 | Fukatsu | |
| 5,340,967 | A | 8/1994 | Martin et al. | |
| 5,366,407 | A | 11/1994 | Sentoku | |
| 5,429,551 | A | 7/1995 | Uecker et al. | |
| 5,467,857 | A | 11/1995 | Takemoto | |
| 5,469,951 | A | 11/1995 | Takemoto et al. | |
| 5,483,047 | A * | 1/1996 | Ramachandran et al. | 235/379 |
| 5,561,281 | A | 10/1996 | Eda et al. | |
| 5,564,546 | A | 10/1996 | Molbak et al. | |
| 5,620,079 | A | 4/1997 | Molbak | |
| 5,788,348 | A * | 8/1998 | Ramachandran et al. | 312/223.1 |
| 5,799,767 | A | 9/1998 | Molbak | |
| 5,830,054 | A | 11/1998 | Petri | |
| 5,883,371 | A | 3/1999 | Meeker | |
| 5,884,745 | A * | 3/1999 | Kalis et al. | 194/217 |
| 5,902,178 | A | 5/1999 | Perkitny | |
| 5,909,794 | A | 6/1999 | Molbak et al. | |
| 5,918,720 | A | 7/1999 | Robinson et al. | |
| 5,989,118 | A | 11/1999 | Chiba et al. | |
| 6,039,164 | A * | 3/2000 | Waters et al. | 194/206 |
| 6,080,056 | A | 6/2000 | Karlsson | |
| 6,086,471 | A | 7/2000 | Zimmermann | |
| 6,128,402 | A | 10/2000 | Jones et al. | |
| 6,206,284 | B1 | 3/2001 | Do | |
| 6,318,536 | B1 | 11/2001 | Korman et al. | |
| 6,318,537 | B1 | 11/2001 | Jones et al. | |
| 6,371,845 | B1 | 4/2002 | Ishida et al. | |
| 6,484,863 | B1 | 11/2002 | Molbak | |
| 6,601,045 | B1 | 7/2003 | DePietro et al. | |
| 6,609,604 | B1 | 8/2003 | Jones et al. | |
| 6,637,576 | B1 | 10/2003 | Jones et al. | |
| 6,684,334 | B1 * | 1/2004 | Abraham | 713/194 |
| 6,736,251 | B2 | 5/2004 | Molbak | |
| 6,758,737 | B2 | 7/2004 | Svensson | |
| 6,789,732 | B2 * | 9/2004 | Dollhopf et al. | 235/381 |
| 6,854,581 | B2 | 2/2005 | Molbak | |
| 6,896,118 | B2 | 5/2005 | Jones et al. | |
| 6,896,177 | B2 | 5/2005 | Carter | |
| 6,934,688 | B2 | 8/2005 | Carter | |
| 6,968,321 | B1 * | 11/2005 | Yu | 705/43 |
| 6,976,570 | B2 | 12/2005 | Molbak | |
| 6,981,633 | B2 | 1/2006 | Inoue et al. | |
| 6,983,836 | B2 | 1/2006 | Adams et al. | |
| 7,028,827 | B1 | 4/2006 | Molbak et al. | |
| 7,036,651 | B2 | 5/2006 | Tam et al. | |
| 7,073,707 | B2 | 7/2006 | Carter | |
| 7,077,312 | B2 | 7/2006 | Putman et al. | |
| 7,131,580 | B2 | 11/2006 | Molbak | |
| 7,163,454 | B2 | 1/2007 | Carter | |
| 7,192,341 | B2 | 3/2007 | Takamisawa et al. | |
| 7,213,697 | B2 | 5/2007 | Martin et al. | |
| 7,244,175 | B2 | 7/2007 | Adams et al. | |
| 7,303,119 | B2 | 12/2007 | Molbak | |
| 7,992,777 | B1 * | 8/2011 | Block et al. | 235/379 |
| 2002/0019210 | A1 | 2/2002 | Cole | |
| 2002/0107800 | A1 * | 8/2002 | Kadowaki et al. | 705/43 |
| 2002/0151267 | A1 | 10/2002 | Kuhlin et al. | |
| 2002/0156734 | A1 | 10/2002 | Yamamoto | |
| 2002/0162724 | A1 | 11/2002 | Hino et al. | |
| 2003/0057271 | A1 * | 3/2003 | Andersen et al. | 235/379 |
| 2003/0111395 | A1 | 6/2003 | Aas et al. | |
| 2003/0150688 | A1 | 8/2003 | Martin et al. | |
| 2004/0099729 | A1 | 5/2004 | Utz et al. | |
| 2004/0149818 | A1 | 8/2004 | Shepley et al. | |
| 2004/0181481 | A1 | 9/2004 | Carter | |
| 2004/0186937 | A1 | 9/2004 | Jonsson | |
| 2004/0200690 | A1 | 10/2004 | Adams et al. | |
| 2004/0212141 | A1 | 10/2004 | Graef et al. | |
| 2004/0231956 | A1 | 11/2004 | Adams et al. | |
| 2005/0167482 | A1 | 8/2005 | Ramachandran | |
| 2006/0060363 | A2 | 3/2006 | Carter | |
| 2006/0090909 | A1 | 5/2006 | Carter | |
| 2006/0144670 | A1 | 7/2006 | Gunst et al. | |
| 2006/0220845 | A1 * | 10/2006 | Agrawal et al. | 340/545.1 |
| 2007/0069007 | A1 | 3/2007 | Molbak | |

FOREIGN PATENT DOCUMENTS

| | | | |
|---|---|---|---|
| DE | 30 121 243 | | 10/1980 |
| EP | 0 310 452 | | 3/1988 |
| EP | 0 734 001 | | 9/1996 |
| EP | 0 831 431 | A2 | 3/1998 |
| EP | 0 911 769 | | 4/1999 |
| EP | 1 008 965 | A1 | 6/2000 |
| EP | 1 256 915 | A1 | 11/2002 |
| EP | 1 304 664 | A2 | 4/2003 |
| EP | 1 308 908 | | 5/2003 |
| EP | 1 376 488 | A1 | 1/2004 |
| EP | 1 378 869 | A2 | 1/2004 |
| EP | 1 381 000 | A1 | 1/2004 |
| EP | 1 413 993 | | 4/2004 |
| EP | 1 526 483 | A2 | 4/2005 |
| EP | 1 577 846 | A2 | 9/2005 |
| EP | 1 635 300 | A1 | 3/2006 |
| FR | 2 784 772 | | 4/2000 |
| FR | 2 819 332 | | 7/2002 |
| FR | 2 824 165 | | 10/2002 |
| FR | 2 841 024 | | 12/2003 |
| GB | 2415819 | | 1/2006 |
| JP | 52049097 | | 4/1977 |
| JP | 10-79066 | A | 3/1998 |
| JP | 2004334597 | | 11/2004 |
| JP | 2005-4347 | | 1/2005 |
| JP | 2005208944 | | 8/2005 |
| JP | 2005-235081 | | 9/2005 |
| SE | 504 700 | | 4/1997 |
| SE | 524 041 | | 4/2004 |
| WO | WO 95/30215 | | 11/1995 |
| WO | WO 96/36933 | | 11/1996 |
| WO | WO 97/43739 | | 11/1997 |
| WO | WO 00/37317 | | 6/2000 |
| WO | WO 00/65546 | | 11/2000 |
| WO | WO 01/54084 | | 7/2001 |
| WO | WO 2004/010367 | | 1/2004 |
| WO | WO 2004/081735 | | 9/2004 |
| WO | WO 2004/081885 | | 9/2004 |
| WO | WO 2004/093021 | | 10/2004 |
| WO | WO 2005/104046 | | 11/2005 |
| WO | WO 2006/019917 | | 2/2006 |
| WO | WO 2006/062834 | | 6/2006 |
| WO | WO 2007/034699 | | 3/2007 |
| WO | WO 2007/035420 | | 3/2007 |

OTHER PUBLICATIONS

International Preliminary Report on Patentabiltiy—PCT/SE2005/001120—Dated Oct. 10, 2006.

Scan Coin Technical Manual, Cash Deposit System Model CDS 600 & CDS 400, 1991, Table of Contents and pp. 1-3, 7-17, 43, 44 and 49-52.

International Search Report—PCT/SE2007/000733.

Scan Coin CDS MK 1 Cash Deposit System User's Manual—pp. 1-11—published prior to Nov. 2004.

Scan Coin CDS 640 User's Manual—pp. 1-21—published prior to Nov. 2004.

IBM Technical Disclosure Bulletin—Automatic Teller Machine With Loose Coin Depository—vol. 28 No. 11 Apr. 1986—pp. 4749 and 4750.

IBM 4730 Personal Banking Machine—5 page brochure—published prior to Nov. 2004.

IBM 4700 Finance Communication System—Solutions for successful banking—7 page brochure—published prior to Nov. 2004.

* cited by examiner

Legend:

[e.g. green light] – coin box is empty

[e.g. no light] – coin box contains coins

[e.g. red light] – coin box is full and needs to be emptied or replaced

416

| From (417) | To (418) | Peripheral ID (419) |
|---|---|---|
| 100 | 199 | 821 |
| 200 | 499 | 160 |
| 500 | 999 | 344 |
| 1000 | 1999 | 185 |
| 2000 | 4999 | 193 |
| 5000 | 9999 | 211 |
| 10000 | 19999 | 254 |
| 20000 | 49999 | 141 |

CASH DEPOSIT APPARATUS AND ASSOCIATED METHODS AND DEVICES

CROSS-REFERENCE TO RELATED APPLICATION

This application claims the benefit of Swedish patent application no. 0502492-2, filed on Nov. 11, 2005 and U.S. provisional patent application No. 60/736,601, filed on Nov. 14, 2005.

INCORPORATION BY REFERENCE

The specification and drawings of Swedish patent application No. 0502492-2, filed on Nov. 11, 2005 and the specification and drawings of U.S. provisional patent application No. 60/736,601, filed on Nov. 14, 2005, are incorporated herein in their entirety, by this reference.

FIELD OF THE INVENTION

The present invention relates to cash handling, and more particularly to a cash deposit apparatus, and to methods and devices associated with such a cash deposit apparatus.

TECHNICAL BACKGROUND

Cash deposit apparatuses are used for depositing cash such as coins, notes (bills), cheques or coupons. A cash deposit apparatus is typically a stand-alone apparatus which is used on a self-service basis by an arbitrary, untrained end-user visiting a public site such as a bank office, mall, shopping area, store, etc.

When using a typical cash deposit apparatus, the end-user will place his cash in a cash input area, whereby the cash deposit apparatus will discriminate between acceptable cash, such as valid coins in a plurality of different denominations in one or more specified currencies, and unacceptable cash, such as fake (counterfeit) coins or coins of a foreign currency. A coin acceptance module handles the discrimination of coins and acts to count the acceptable coins, and also to sort them provided that the coin acceptance module has sorting capabilities, whereas the unacceptable cash will be rejected. A value related to the acceptable cash as counted is determined, normally either as the total value of the counted cash, or the total value minus a certain commission fee or plus a certain bonus. The determined value may be a printed on a receipt or voucher which is dispensed to the end-user so as to allow later redemption of the value at a checkout counter, service desk, etc, or the value may be credited to a bank account or credit card belonging to the end-user. The deposited cash is stored inside the cash deposit apparatus for later collection by authorized personnel such as guards or personnel from a CIT (Cash-In-Transit) company.

A cash deposit apparatus usually has a user interface which the end-user of the apparatus will avail himself of when using the apparatus. The user interface typically includes a display and a set of operation keys, and, often, at least either a printer or a card reader. These elements of the user interface are controlled from a controller in the apparatus, such as a personal computer (PC) or another kind of microprocessor-based control system. The controller also controls the overall operation of the internal parts of the cash deposit apparatus.

Cash deposit apparatuses have been in commercial use since the late 1980's and have grown very popular. Nevertheless, the present inventors have identified certain areas in the field of cash deposit apparatuses that need improvement in order to meet future market demands and mitigate various technical shortcomings with existing cash deposit apparatuses, as will be explained in more detail throughout this document. Some of these areas are:

Configurability

Hitherto, when developing a new model of a cash deposit apparatus, the manufacturer of the apparatus has had to design the model more or less from scratch, or alternatively reuse an existing design which is limited to a certain configuration as regards physical cabinet (housing) dimensions, interface for service personnel access, interface for CIT personnel access, type and number of peripheral devices such as display, operation keys, keypad, printer or card reader, type of cash acceptance module (e.g. coin counter, coin sorter, note validator), etc. Therefore, the needs of potential customers of the new model (e.g. the site holders), as wells as end-users, service personnel and CIT personnel, cannot always be met in an efficient way.

Upgradeability

For a customer of a cash deposit apparatus, it is important to make the investment as future proof as possible. However, a cash deposit apparatus is typically operational for several years, and as time passes, it is far from certain that the specifications of the once purchased cash deposit apparatus meet the needs that may have developed for a long time after the purchase of the apparatus. Such changed needs may for instance imply that an originally purchased cash deposit apparatus, that contains a low-performance, counting-only coin acceptance module which once was deemed sufficient, is now insufficient for the current needs in terms of e.g. cash processing performance, sorting capability or ability to handle also other cash such as notes.

In the current state of the art, such needs will have to be met by drastically rebuilding the current apparatus, this may involve uninstalling the apparatus, possibly installing a temporary replacement apparatus, transporting the apparatus back to the factory and severely modifying it to meet the current needs, and then finally returning the thus rebuilt apparatus to its installation site and have it reinstalled. Clearly, this approach has severe penalties in terms of cost, time and effort.

Alternatively, such needs may be met by ordering and purchasing a new model and completely replacing the existing apparatus. However, in many situations this will be an excessive action, particularly if the existing apparatus only has grown insufficient in a particular aspect, such as cash processing performance, but is otherwise working well and meeting all other needs.

Reliability

Since the cash deposit apparatus is typically used "in the field" and on a self-service basis, it is a key factor in the technical field to maximize the mean time between failures (MTBF).

Serviceability

In addition, since the total cost of ownership is often more important to a customer of a cash deposit apparatus than the initial investment, it is desired to keep the mean time to repair (MTTR) as short as possible.

It is also important to provide for an efficient manner of upgrading the software in the cash deposit apparatus (e.g. for correcting bugs) and also updating the reference data which is used by the cash acceptance module when discriminating cash. Such reference data may for instance have to be updated to reflect the issuance of new coins or notes, or to improve the cash acceptance module's ability to catch new types of fake coins or notes that have recently started to circulate in a particular region or country.

SUMMARY OF THE INVENTION

A general object of the invention is to provide improvements in the above-mentioned and other areas in the field of cash handling, particularly for cash deposit apparatuses.

This object is wholly or partially achieved by a cash deposit apparatus, and associated methods and devices, according to the appended independent claims. Preferred embodiments, and the objects, features and advantages thereof, are set forth in the dependent claims and in the following description and attached drawings.

In general, a first aspect of the invention is generally directed to a cash deposit apparatus. The cash deposit apparatus generally comprises a user interface module adapted to provide a user interface at a first external side of the cash deposit apparatus for allowing a user to interact with the cash deposit apparatus to transact a cash processing transaction. A cash processing module is adapted to process cash as deposited by the user for the cash processing transaction and to determine a value related to the processed cash. The cash processing module has a service interface for providing access to the cash processing module. A cash storage module stores cash as processed by the cash processing module. The cash storage module has a cash storage interface for providing access to the cash storage module. The cash processing module is independently configurable between a first cash processing module configuration wherein the service interface provides access from the first external side of the cash deposit apparatus and a second cash processing module configuration wherein the service interface provides access from a second external side of the cash deposit apparatus. The second external side is different from the first external side. The cash storage module is independently configurable between a first cash storage module configuration wherein the cash storage interface provides access from the first external side of the cash deposit apparatus and a second cash storage module configuration wherein the cash storage interface provides access from a third external side of the cash deposit apparatus. The third external side is different from the first external side.

As will be described in more detail in the following sections, this allows a modular design concept that provides excellent configurability, upgradeability and serviceability.

The third external side may coincide with (e.g. be the same as) the second external side, and the first external side is advantageously a front cabinet side of the cash deposit apparatus, whereas the second (third) external side is a rear cabinet side of the cash deposit apparatus.

The service interface may include a lockable cabinet generally preventing access to interior elements of the cash processing module but permitting access by a service person. Particularly when the service interface provides access from the rear cabinet side, the service interface advantageously comprises a service user interface comprising at least one of a visual output device, a printer and an input device.

The service interface may also comprise an indicator adapted to indicate to the service person whether or not there is an ongoing cash processing transaction in the cash processing module.

In some embodiments, an automatic mode switch is provided for detecting opening of the lockable cabinet and for switching a mode of the user interface of the apparatus from a current mode to a service mode. The automatic mode switch may be adapted for detecting that there is an ongoing cash processing transaction in the cash processing module and delaying the switching to the service mode until the ongoing cash processing transaction has reached completion or a predefined stage.

The cash storage interface may include a lockable cabinet generally preventing access to interior elements of the cash storage module but permitting access by a person authorized to remove cash from the cash storage module.

In a second aspect, the invention is generally directed to a method for producing a cash deposit apparatus to have a user interface module for providing a user interface, a cash processing module for processing deposited cash to determine a value related to the processed cash and having a service interface, and a cash storage module for storing cash as processed by the cash processing module and having a cash storage interface. The method generally comprises selecting, among more than one available orientation, a service interface orientation for the service interface. The service interface of the cash processing module is configured to have the selected service interface orientation. A cash storage interface orientation for the cash storage interface is selected among more than one available orientation. The cash storage interface of the cash storage module is configured to have the selected cash storage interface orientation. The cash deposit apparatus is produced by assembling the user interface module, the cash processing module, and the cash storage module.

In a third aspect, the invention is generally directed to a cash deposit apparatus. The cash deposit apparatus generally comprises a cash processing module adapted to process cash as deposited by an user in a cash processing transaction and to determine a value related to the processed cash. A cash storage module has at least one cash storage receptacle for storing cash as processed by the cash processing module. The at least one storage receptacle is removably retained within a secure cash storage chamber of the cash storage module. The cash storage module has a cash storage interface for providing access for an authorized person to the at least one cash storage receptacle, and a user interface. The user interface of the cash storage module having a first indicator adapted to indicate to the authorized person whether or not there is an ongoing cash processing transaction in the cash processing module, and a second indicator adapted to provide to the authorized person an indication related to the presence or absence of coins in the at least one cash storage receptacle.

Advantageously, the indication provided by the second indicator has at least the following possible states:

a first state to indicate that the at least one cash storage receptacle currently is empty;

a second state to indicate that the at least one cash storage receptacle currently contains some cash but is not full; and a third state to indicate that the at least one cash storage receptacle is currently full of cash.

The user interface may further comprise an actuator for the at least one cash storage receptacle adapted for actuation by the authorized person, wherein the actuation causes the second indicator to indicate current absence of cash in the cash storage receptacle. The actuation of the actuator may also cause generation of a verification on an operation performed by the authorized person. The aforementioned operation may involve emptying or removal by the authorized person of the cash storage receptacle, wherein the verification is a printed receipt containing information related to a total value of cash contained in the cash storage receptacle prior to such removal or emptying.

In one embodiment, the user interface is an operator panel mounted on an inside of a cabinet door of the cash storage module.

In a fourth aspect, the invention is generally directed to a cash deposit apparatus. The cash deposit apparatus generally comprises at least one input/output port. The apparatus is configured to identify a peripheral device connected to the at least one input/output port and to automatically configure the apparatus for use with the connected peripheral device.

In a fifth aspect, the invention is generally directed to a method for initializing a peripheral device when connected to a cash deposit apparatus. The method comprising the steps of obtaining a signal by reading an identifier unit comprised in the peripheral device, interpreting the signal as a type identity of the peripheral device, and, based on the type identity, automatically configuring the cash deposit apparatus for use with the connected peripheral device.

The step of automatically configuring the cash deposit apparatus may involve loading at least one driver from memory.

The step of obtaining a signal by reading an identifier unit comprised in the peripheral device may comprise: querying the identifier unit for a digitally represented identifier type, and receiving a response signal from the peripheral device comprising the digitally represented identifier type. A digital identifier unit has the advantage of having a predictable behavior.

Alternatively, the identifier unit may have a measurable analog value and the step of obtaining a signal by reading the identifier unit comprised in the peripheral device may comprise: measuring the measurable analog value of the identifier unit. An analogue identifier unit has the advantage of being simple and inexpensive to implement.

In a sixth aspect, the invention is generally directed to a license device comprising a memory and adapted to be connected to a cash deposit apparatus. The license device comprises at least one license key in the memory. This allows licenses to be easily transported.

The license device may further comprise details about what model the cash deposit apparatus and/or about elements comprised in the apparatus.

The license device may further comprise information about the cash deposit apparatus such as model information relating to the cash deposit apparatus and elements comprises in the cash deposit apparatus. Alternatively, or in addition, the license device may contain software updates and the license device may be adapted to transfer the software updates to a memory of the cash deposit apparatus. This provides an efficient way to distribute software updates in a controlled manner.

The license device may further comprise configuration data for the cash deposit apparatus.

In a seventh aspect, the invention is generally directed to a cash deposit apparatus. The cash deposit apparatus generally comprises a controller capable of executing at least one software function. The controller is configured to enable the at least one software function when a corresponding license key is present in a license device. The license device is connected to the cash deposit apparatus. Control by a controller in this manner allows one machine to have several different software function configurations that depend on the connected license device.

In an eighth aspect, the invention is generally directed to a method for synchronizing a license device with a cash processing module. The method comprising the steps of starting up the cash processing module and the cash processing module replacing a software module of the cash processing module with a corresponding software module stored in the license device, if the corresponding software module in the license device is newer than the software module of the cash processing module. The cash processing module replaces configuration data of the cash processing module with corresponding configuration data stored in the license device, if the corresponding configuration data in the license device is newer than the configuration data of the cash processing module. The cash processing module replaces run-time data of the cash processing module with corresponding run-time data stored in the license device, if the corresponding configuration is newer than the configuration of the cash processing module.

The method of synchronizing of this aspect may generally comprises the further steps of storing the configuration data in the license device and storing the run-time data in a buffer for storage in the license device.

In a ninth aspect, the invention is generally directed to a cash deposit apparatus comprising a controller and a network interface for connection to a network. The controller is adapted to execute web server software, allowing a remote user to interact with the cash deposit apparatus over the network using a remote client. The web server allows efficient management of the cash deposit apparatus.

The cash deposit apparatus may further be adapted to allow the remote user to configure parameters controlling an operation of the cash deposit apparatus, or to retrieve operational information of the cash deposit apparatus.

In a tenth aspect, the invention is generally directed to a cash deposit apparatus. The cash deposit apparatus generally comprises a controller, a memory and a printer. The memory comprises a configurable definition of a receipt type. The controller is configured to control the printer to print the receipt type according to the configurable definition. An eighth aspect of the invention is a cash deposit. This allows flexible receipt configuration and creation.

In an eleventh aspect, the invention is generally directed to a cash deposit apparatus adapted to accept cash of a first currency and to provide a corresponding credit to a user in a second currency. The credit being calculated using an exchange rate and a commission. The credit depends on an identity of the user.

In a twelfth aspect, the invention is generally directed to a cash deposit apparatus generally comprising an input device and a display. The cash deposit apparatus is operable in a plurality of languages. An operating language is selectable by a user among the plurality of languages. Allowing multiple languages to be used in a simple way improves the user experience, especially for tourists or countries with multiple languages.

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the invention.

BRIEF DESCRIPTION OF THE DRAWINGS

A number of exemplifying but non-limiting embodiments of a cash deposit apparatus according the invention will now be described with reference to the appended drawings.

DETAILED DESCRIPTION OF THE EXEMPLARY EMBODIMENT

Figure 1:
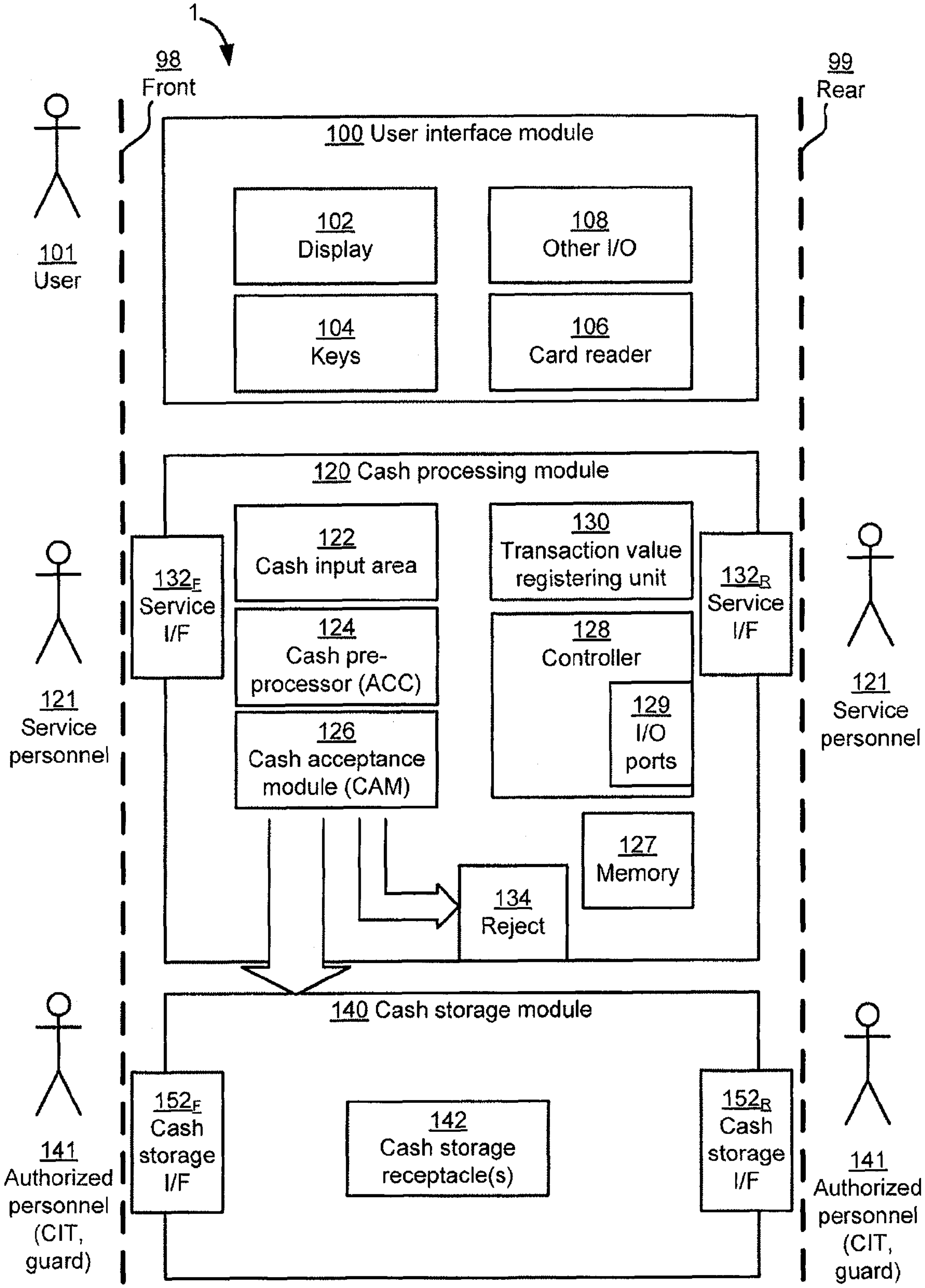
FIG. 1 is a schematic block diagram which illustrates a modular cash deposit apparatus design according to one aspect of the invention.

Generally, elements in different drawings that are the same, or equivalent or corresponding to each other, are represented by the same or like reference numerals, such that "1nn" and "2nn", or "xnn", "xnn'" and "xnn"", where x=1 or 2 and n=0 . . . 9, represent such same, equivalent or corresponding elements.

Reference is now made to FIG. 1 which illustrates a modular cash deposit apparatus design.

The cash deposit apparatus 1 generally consists of three main modules: a user interface module 100 at the top of the apparatus 1, a cash processing module 120 at the center of the apparatus 1, and a cash storage module 140 at the base of the apparatus 1. See also FIG. 2, where a first embodiment of the cash deposit apparatus 1 is shown in perspective front view.

The cash deposit apparatus design presented in FIG. 1 is modular, both on a main level in that different alternatives of the main modules 100, 120 and 140 may be combined in a large number of ways, thereby providing excellent configurability, and on lower levels in that different elements of the main modules 100, 120 and 140 are exchangeable and conveniently accessible in ways that provide excellent upgradeability and serviceability, as will be explained in more detail later.

The user interface module 100 has a display 102 and a set of operation keys 104, which together form a user interface for allowing a user, such as an end-user 101, customer, or other personnel, to use the cash deposit apparatus 1. The cash deposit apparatus can perform various cash processing functions such as a cash deposit transaction wherein the user deposits a sum of money with the cash deposit apparatus and receives credit to an account, or other cash processing functions such as coin or note counting transactions which may result in the user receiving a redeemable receipt in exchange for the counted notes or coins, or any other suitable transaction. The display 102 will present information, such as help messages, error messages and transaction results, that assists the end-user 101 throughout the cash processing transaction. The set of operation keys 104 will allow the end-user to provide controlling input to the cash deposit apparatus 1, for instance commands for starting, confirming or aborting a cash processing transaction, or commands for selecting among different available options at various stages of the transaction.

Figure 19:
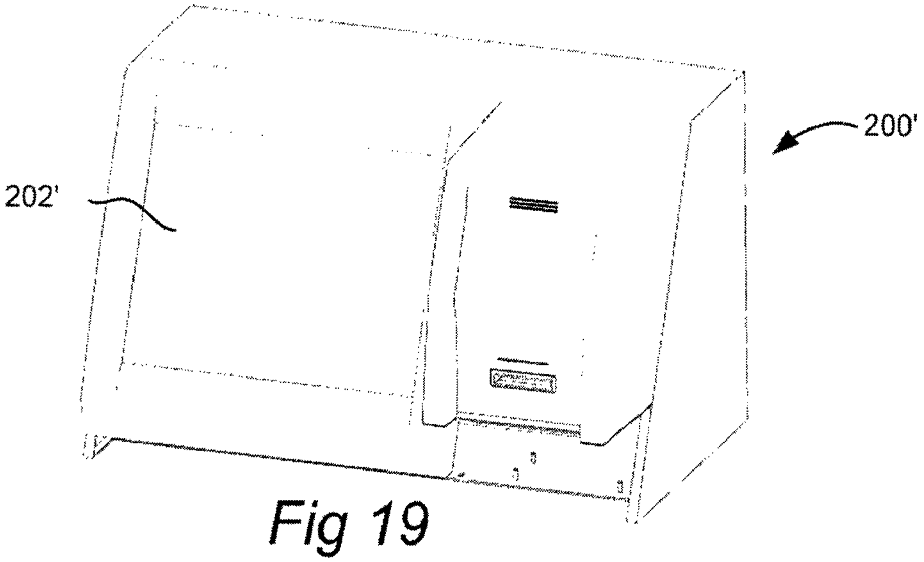
FIG. 19 is a perspective front view of an alternative user interface module, employing a different kind of display than the first embodiment of FIGS. 2-5 and which may be mounted on the top of the cash deposit apparatus to replace its user interface module.
Figure 20:
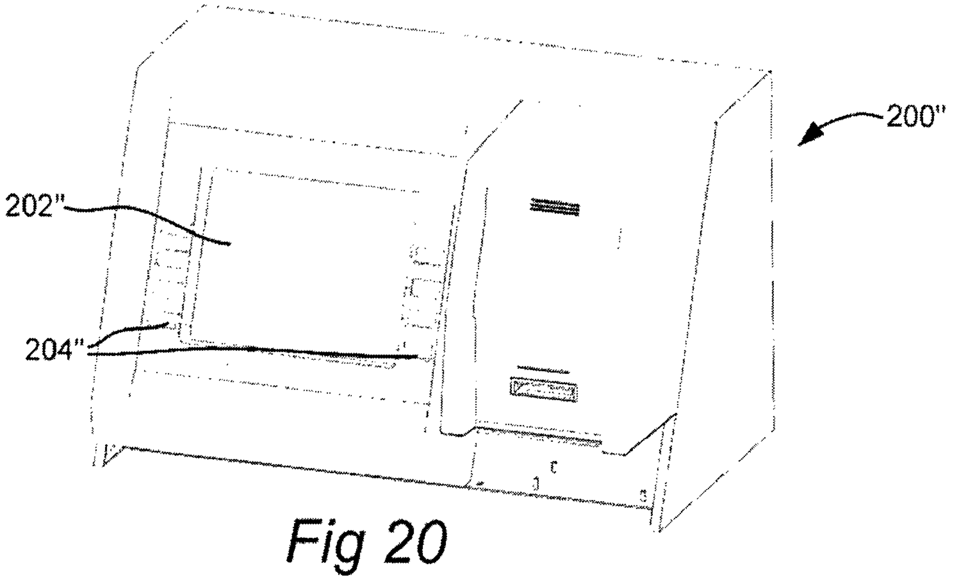
FIG. 20 is a perspective front view of yet an alternative user interface module.

In the first embodiment of FIGS. 2-5, the display 202 is a two-row matrix (character-based) monochrome display, and the set of operation keys includes START/STOP and PRINT buttons 204 as well as a numerical PIN-type keypad 204' with an additional row of functional keys. In the alternative shown in FIG. 19, the display 202' is a touch-sensitive graphical color display, thereby making it possible to also implement the set of operation keys 104, or parts thereof, as virtual keys on the touch-sensitive display screen. In the alternative shown in FIG. 20, the display 202" is a graphical color LCD display, and the set of operation keys includes two rows 204" of functional keys disposed at either sides of the display 202".

Figure 2:
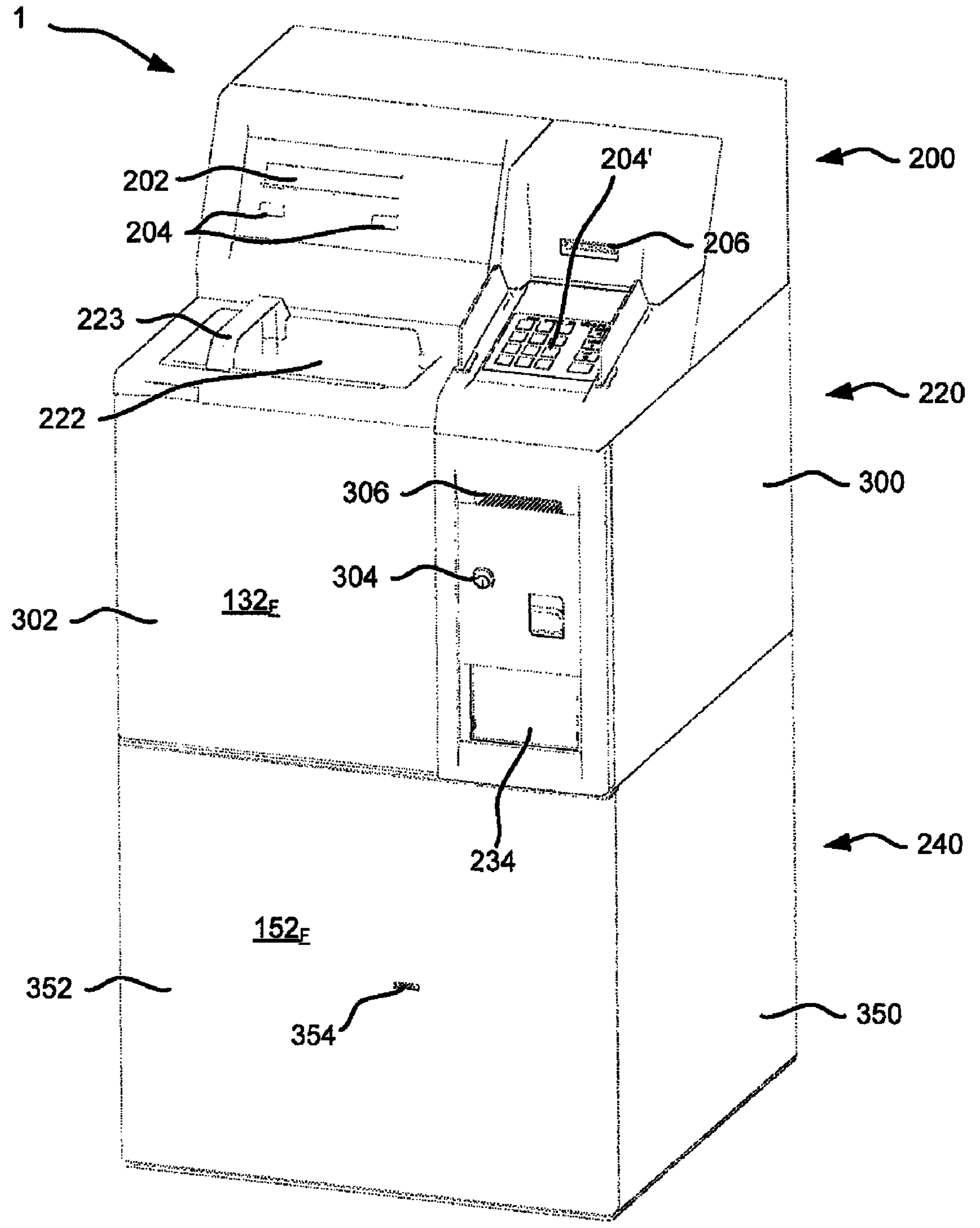
FIGS. 2-5 are perspective front views of a cash deposit apparatus according to a first embodiment that has a coin-counting cash acceptance module and front-oriented service interface and cash storage interface.
Figure 3:
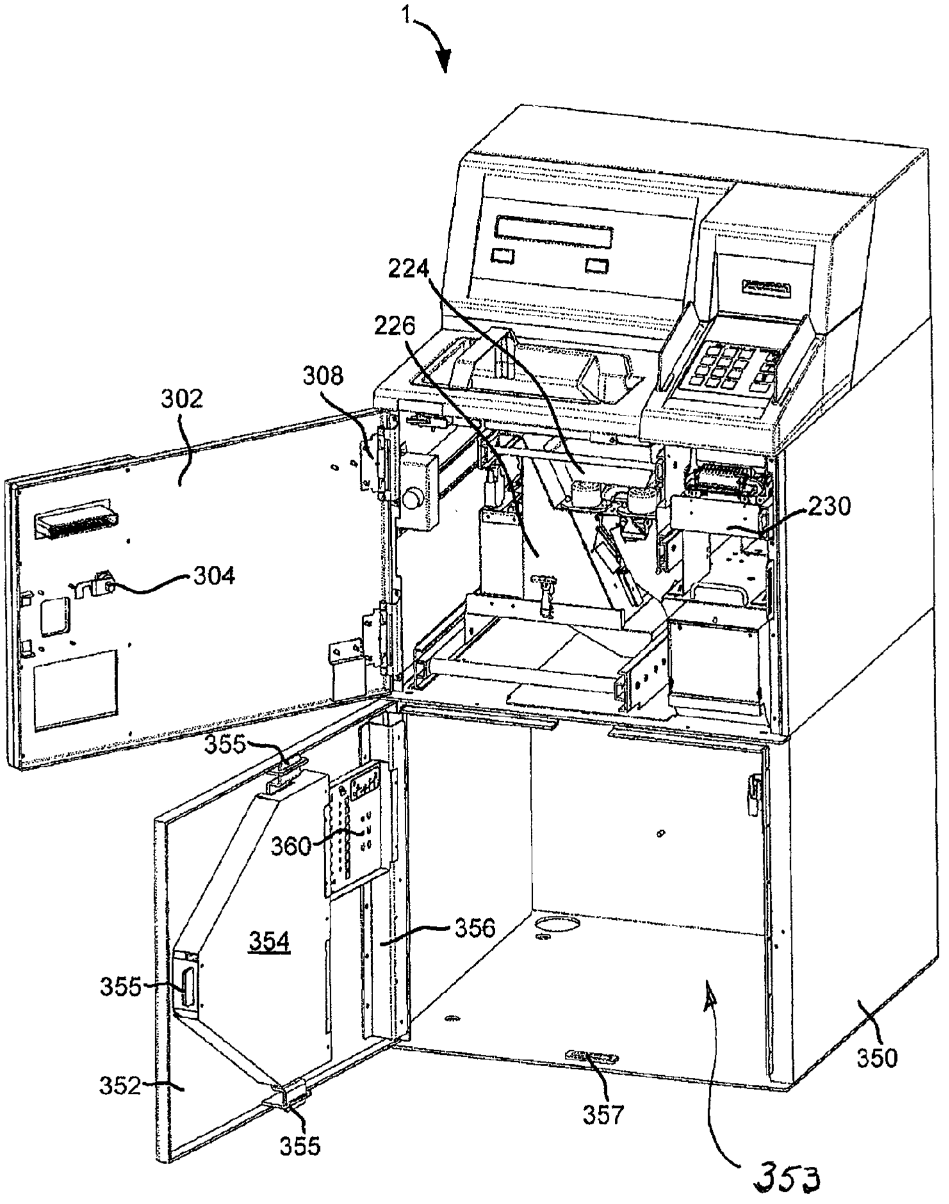
Figure 4:
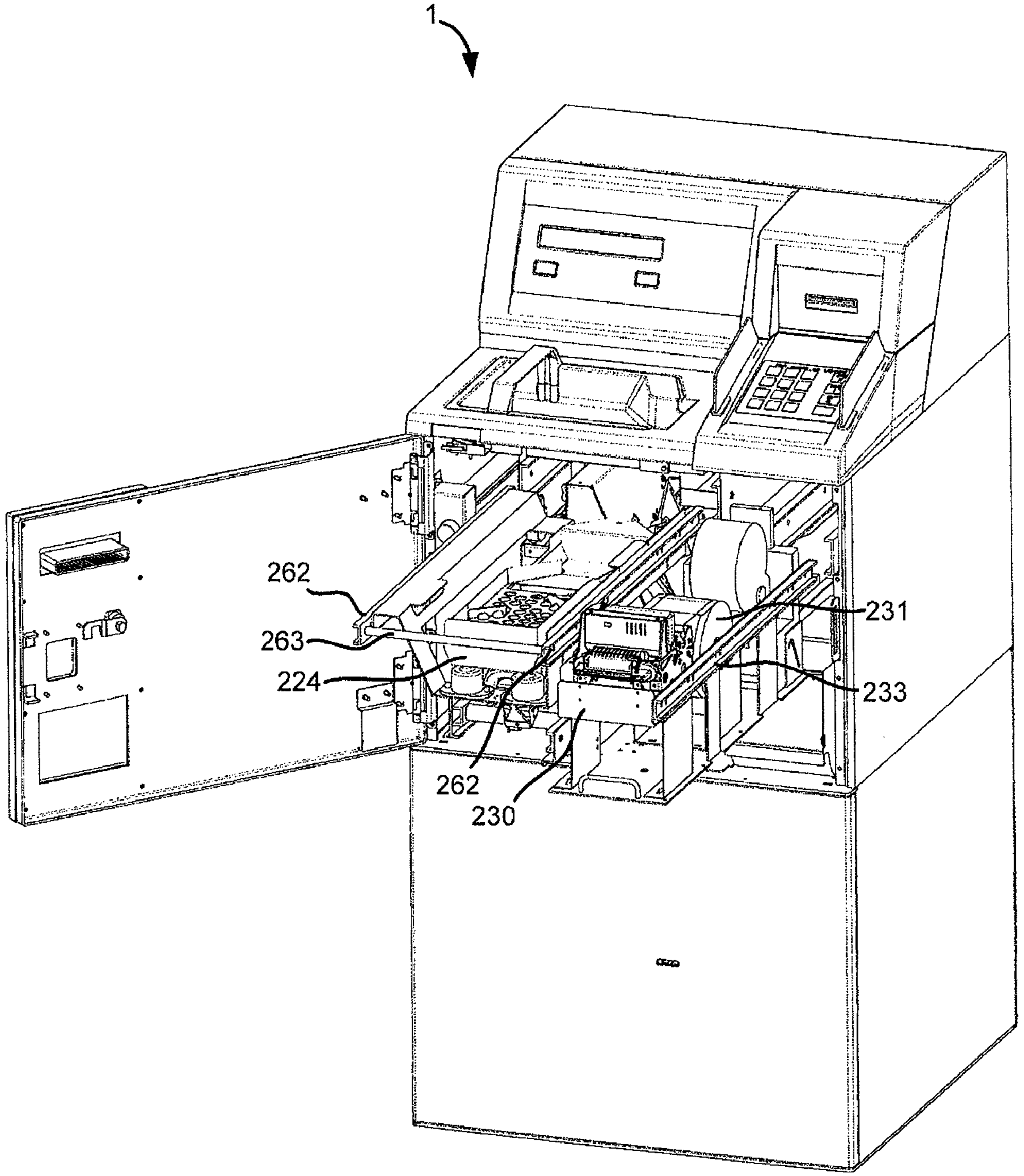

The user interface module 100 also has a card reader 106 capable of reading and/or writing digital data on a data carrier inserted in a card reader slot (only the slot 206 is seen in FIG. 2). The data carrier may for instance be an electrically, magnetically or optically readable card, such as a smart card, adapted to contain for instance information related to an identity of the end-user 101, or related to an asset belonging to the end-user such as a bank account. Alternatively, the data carrier may be adapted to receive and store information on a value resulting from a completed transaction and related to the acceptable deposited cash once counted by the cash deposit apparatus 1.

Other I/O devices such as a speaker and a microphone may be included in the user interface module 100, as is generally represented by 108 in FIG. 1.

The cash processing module 120 is the heart of the cash deposit apparatus 1 and has elements that handle the flow of cash all the way from input (deposit) by the end-user 101 through discrimination, counting/sorting to output into the cash storage module 140. In more detail, a cash input area 122 is adapted to receive cash as deposited by the end-user 101. In the first embodiment shown in FIG. 2, the cash input area 122 is a coin input tray 222 having a handle 223. In this embodiment, the end-user 101 will put into the coin input tray 222 an unsorted mass of coins, of an unknown composition that typically consists of a plurality of valid coins of mixed denominations, plus potentially some invalid coins and/or foreign matter such as dirt, dust or solid non-coin objects like screws, nuts, hair pins, studs, etc. When the mass of coins has been put into the tray 222, the end-user 101 may tilt the tray by lifting the handle 223. This will cause the mass of coins to slide down the bottom surface of the tray 222 and enter the interior of the cash processing module 120.

The next stage in the cash processing module 120 is a cash pre-processing unit 124 which acts to perform a conditioning or cleaning operation on the cash received through the cash input area 122. In the first embodiment of FIGS. 2-5, the cash pre-processing unit is an automatic coin conditioning (ACC) unit 224 that involves a vibratory arrangement of perforated plates which will separate foreign matter from the received mass of coins. As is seen particularly in FIG. 4, the ACC unit 224 is suspended by a pair of rails 262 which can be slidably withdrawn from the interior of the cash processing module 120 by e.g. a service person 121 pulling a horizontal front bar 263. In this way, the ACC unit 224 can be conveniently accessed for maintenance, replacement, repair or fault relief (e.g. when a coin or foreign object has gotten stuck). Other conventional ACC units may be suitable for use in the cash deposit apparatus 1 in the manner described above.

Figure 17:
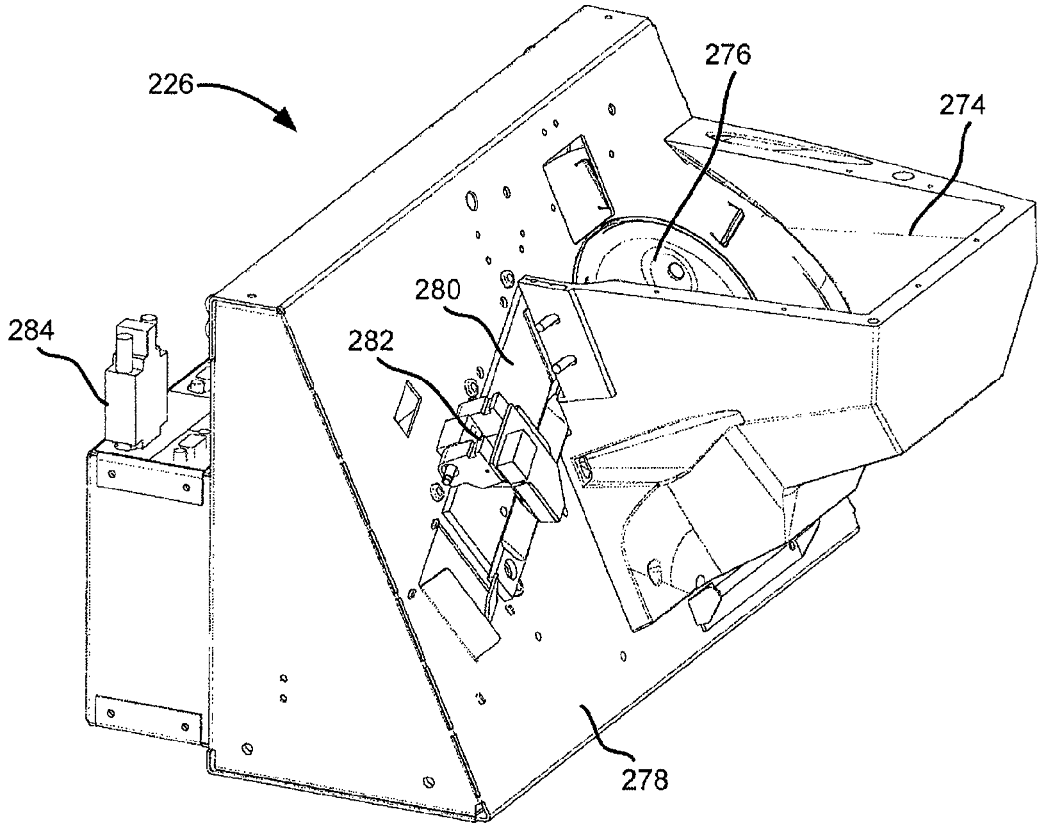
FIGS. 17 and 18 are perspective front and rear views, respectively, of a coin-counting cash acceptance module.

When the cash has been conditioned, it is forwarded to a cash acceptance module 126. In the first embodiment of FIGS. 2-5, the cash acceptance module 126 is a coin-counting cash acceptance module (CAM) 226 which is shown in more detail in FIGS. 17-18. As is well known per se in the technical field, the purpose of the coin-counting CAM 226 is to discriminate each individual coin in the mass of coins received from the coin input tray through the ACC 224 and determine its type (i.e., whether the coin is invalid or valid, and, if valid, its denomination).

To this end, the CAM 226 will receive the coins from the output of the ACC 224 via a receiving tray 272 into a hopper bowl 274. A rotary flexible disc 276 is provided in the hopper bowl 274 and acts to pick up individual coins from the bottom of the bowl and bring them, coin by coin, up to the beginning of a downwardly sloping coin rail 280 which is mounted to a backwardly inclined front plate 278 of the CAM 226. By gravity, and since the coin rail 280 is backwardly inclined, each coin will safely roll down the coin rail 280 and past a coin sensor unit 282.

The coin sensor unit 282 will detect certain physical properties of the passing coin, such as conductivity, permeability, diameter and thickness, and compare these to pre-stored coin reference data in a memory by way of a processor in or coupled to the CAM 226. If the comparison fails to identify the coin as a coin of a valid denomination, it will be regarded as invalid and be deflected through a reject channel 283 (FIG. 5) to a cash reject area 134/234.

Figure 21:
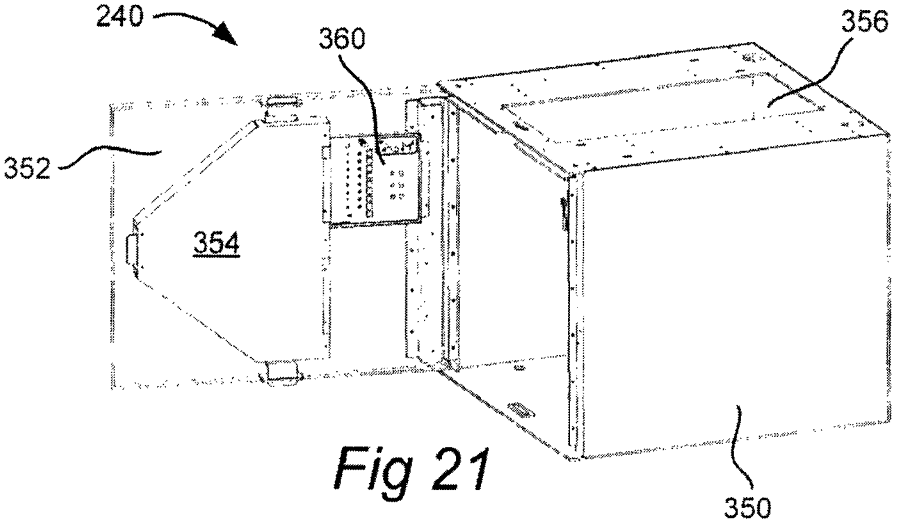
FIG. 21 is a perspective front view of the cash storage module in the first embodiment of FIGS. 2-5.

If on the other hand a valid denomination has been established for the coin, its denomination or associated value will be recorded for later use when calculating a total value for all valid coins processed during the coin deposit transaction upon its completion. The valid coin continues down the coin rail 280 towards its lower end, and then falls down into the underlying coin storage module 140/240, through an opening 356 in the top of its cabinet 350 (see FIG. 21), and is safely stored in a coin storage receptacle 142 (not shown in FIGS. 2-5).

A transaction value registering unit 130 will, upon completed cash deposit transaction, act to register the end result value of the transaction in a manner such that it can be redeemed by the end-user 101 as full or partial compensation for the value represented by the deposited cash. The end result value of the transaction may be equal to the accumulated nominal value of all valid cash processed during the transaction (e.g. the sum of the respective denominations of each valid coin), or related to such accumulated value by way of a currency conversion, deduction of a commission fee, or addition of a bonus award, or any combination of these.

In the first embodiment of FIGS. 2-5, the transaction value registering unit 130 involves a printer 230 which provides a printed redeemable receipt or voucher, delivered through an opening 306, in the amount indicated by the end result value of the transaction. Alternatively or additionally, the transaction value registering unit 130 may involve means for loading the end result value, or a representation thereof, onto a local data carrier, for instance a card inserted in the card reader, or a remote instance such as a bank account administered by a remote server which is accessed via remote communication means.

The cash processing module 120 has a controller 128 that controls the CAM 126 as well as the other elements of the cash processing module 120 and user interface module 100. The controller 128 has associated memory 127 for storing operational data, reference data and program code for any software-based functionality provided by the cash deposit apparatus 1. The controller 128 also has a number of I/O ports 129/229 (FIG. 18) by means of which the various other elements of the cash deposit apparatus 1 can be operatively coupled to the controller 128. Thus, the I/O ports 129/229 may for instance include one or more RS232 serial interface, Centronics parallel interface, universal serial bus interface, FireWire interface, wireless universal serial bus interface, or Bluetooth interface. Moreover, the I/O ports 129/229 may include remote communication means. In the disclosed embodiment of the CAM 226, the I/O ports 229 are disposed at a rear plate 279. As seen for instance in FIGS. 5, 17 and 18, a license device 284 (which will be described in more detail later) may be connected to one of the I/O ports 229.

In some embodiments, the controller 128 is implemented by the aforementioned processor of the CAM 126/226; in other embodiments it is a separate controller, such as a PC-based implementation, which cooperates with the processor of the CAM 126/226 as necessary.

From time to time, as service needs arise, access to the interior elements of the cash processing module 120 is required for a service person 121. Such service needs may include maintenance, repair, replacement or upgrade of elements such as the ACC 224, CAM 226, controller 228, or printer 230. For instance, the printer 230 may have run out of paper, or it is time for scheduled maintenance of the CAM 226.

To this end, a service interface $132_F$ or $132_R$ is provided for the service person 121. The service interface includes a lockable cabinet part which generally prevents access to the interior elements of the cash processing module 120 for an arbitrary end-user 101 but which permits access for the service person 121 by using an appropriate unlocking device. Within the modular design concept of the invention, the service interface can either be front-oriented ($132_F$) and thus accessible from a front side 98 of the apparatus 1, or rear-oriented ($132_R$) and thus accessible from a read side 99.

Examples of embodiments with a front-oriented service interface $132_F$ is found in FIGS. 2-7, whereas a rear-oriented service interface $132_R$ is seen in FIGS. 8-11.

For instance, in the embodiment of FIGS. 2-5, the front-oriented service interface $132_F$ includes a cabinet door 302 which is hinged (308) onto the cash processing module's cabinet (apparatus housing) 300 so as to form a part thereof. A key lock 304 keeps the cabinet door 302 closed and locked during normal operation but can be opened by the service person 121 using the correct key. In many cases the service person 121 needs to interact also electronically with the cash deposit apparatus 1 during service operations, for instance for reading error logs, running diagnostics software or resetting various states or parameters in the apparatus. To this end, the service interface $132_F$ also includes a user interface. Since the service interface $132_F$ is front-oriented and thus accessible from the same front side 98 of the apparatus 1 as the user interface of the user interface module 100, the user interface elements of the latter (e.g. display 102/202 and keys 104/204-204') can implement also the user interface part of the service interface $132_R$. The receipt printer 230 can also be part of the service interface $132_F$ to provide printouts as required through an opening 306 in the cabinet 300.

In the embodiment of FIG. 8 or FIGS. 9-11, the rear-oriented service interface $132_R$ includes a cabinet door 302' hinged at 308' onto the cash processing module's cabinet 300. A key lock 304' keeps the cabinet door 302' closed and locked during normal operation but can be opened, from the rear side 99 of the apparatus 1, by the service person 121. Here, since the service interface $132_R$ is rear-oriented, the user interface elements 102, 104 of the user interface module 100 are not conveniently accessible to the service person 121. Therefore, the rear-oriented service interface $132_R$ includes a separate service user interface 310 on the rear cabinet door 302', accessible from the inside of the door (i.e., when opened as in FIG. 9) and/or from the outside (i.e. when closed as during normal operation).

The separate service user interface 310 advantageously includes a touch-sensitive LCD display, functioning both as output device (display) and input device (virtual user interface elements presented on the touch-sensitive display screen) and thereby avoiding the need for separate service buttons, keypad, etc. Alternatively, the service user interface 310 may include a display such as a simple two-row alphanumeric display or an advanced 10.4" computer display, or other visual output device, and separate service buttons, keypad, etc. A printer may also be included in the service user interface 310 (printer slot being indicated at 312 in FIG. 9).

The separate service user interface 310 may also include an in-use indicator, either on the display or as a separate visual indicator, that indicates to the service person 121 at the rear side 99 that an end-user 101 is currently using the apparatus 1 at its front side 101 is currently using the apparatus 1 at its front side 98 with a cash processing transaction going on. Such an in-use indicator is beneficial, particularly in applications where the front side 98 of the apparatus 1 is not visible or easily accessible when standing at the rear side 99. For instance, when the apparatus 1 is installed through a wall that separates a public area (front side 98) from a back-office area (read side 99), by simply studying the in-use indicator, the service person 121 will know whether or not it is safe to open the rear cabinet door 302' without risking interference with an ongoing cash processing transaction.

For increased operational safety and convenience, the service interface $132_F/132_R$ may include automatic mode switch functionality that detects whenever the cabinet door 302/302' is opened. This may for instance be done by providing the door 302/302' and/or cabinet 300 with an electrical, optical or magnetic switch arrangement that changes state when the door 302/302' is opened from the cabinet 300. When opening of the door 302/302' has been detected, the mode switch functionality automatically checks whether there is any ongoing cash processing transaction.

If no ongoing cash processing transaction is detected, the user interface mode switch functionality automatically switches mode for the user interface from its current mode to service mode. For an apparatus with a front-oriented service interface $132_F$, the relevant user interface is typically that of the user interface module 100, and the current mode will typically be a normal (end-user) mode in an idle state.

If instead the apparatus 1 is one with a rear-oriented service interface $132_R$, both the above-described separate service user interface 310, which is part of the service interface $132_R$ of the cash processing module 120, and the user interface of the user interface module 100 may be involved in the automatic mode switch functionality. In more particular, a message like "Ongoing service" may be shown in the user interface of the user interface module 100, and this user interface may be blocked until service mode has ended, whereas the separate service user interface 310 will enter service mode. This may for instance involve presenting a menu on the display in the service user interface 310 containing available options related to various service operations.

If, on the other hand, there is indeed an ongoing cash processing transaction, the mode switch functionality will wait until the transaction has been completed, advantageously informing the service person 121 about this waiting by displaying a message like "Transaction ongoing" on the display in the service user interface 310. Then, as the transaction is completed, or at least has reached a predefined stage where entry into service mode will not jeopardize the transaction, the mode switch functionality enters service mode for the service user interface 310. At the same time, the user interface of the user interface module 100 may display "Ongoing service" and furthermore prevent the user 101 from initiating any new transactions until service mode has ended.

Thanks to the provision of the automatic mode switch functionality, the service person 121 can always open the rear cabinet door 302' without risking to disturb an ongoing transaction and without seeing for himself whether such transaction is ongoing or even whether any end-user is present at the front of the apparatus 1.

The cash storage module 140, which defines therein a secure cash storage chamber 353 that contains one or more cash storage receptacle(s) 142, serves to safely store the deposited cash. Of course, the deposited and stored cash must be collected at some time. To this end, the cash storage module 140 has a cash storage interface $152_F$, $152_R$ which provides access for an authorized person 141 to the interior of the module 140 so as to collect the stored cash. The authorized person may for instance be a guard of personnel from a CIT company.

The cash storage interface may either be front-oriented, $152_F$, or rear-oriented, $152_R$, just like the afore-described service interface to the cash processing module 120. The cash deposit apparatuses 1 of FIGS. 2-6, 8 and 12-14 have a front-oriented cash storage interface $152_F$, whereas FIGS. 7 and 9-11 show a rear-oriented cash storage interface $152_R$.

In the embodiment of FIGS. 2-5, the cash storage interface $152_F$ includes a cabinet door 352 which is hinged, at 356, to the cabinet or apparatus housing 350 of the cash storage module 240 so as to form a part thereof. The cabinet door 352 has a safety lock 354 which securely keeps the door closed and locked onto the cabinet by way of three latches 355 which engage with corresponding recesses 357.

Figure 23:
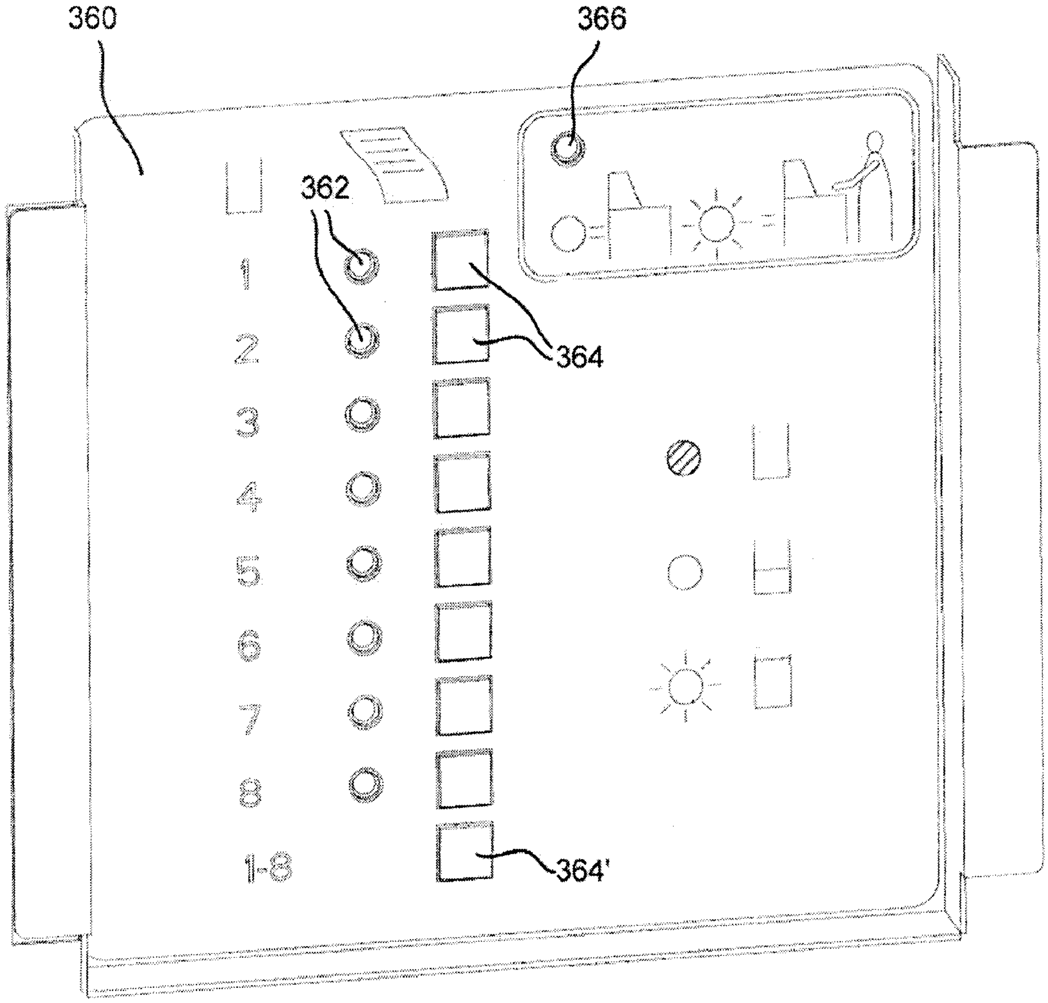
FIG. 23 is a schematic illustration of a user interface part of the cash storage interface for an authorized person to the cash storage module shown in FIG. 6, the user interface part including a set of box emptying buttons and an in-use indicator.

The cash storage interface 152$_F$ also includes a cash storage user interface for interaction with the authorized person 141. In the embodiment of FIGS. 2-5, the cash storage user interface is an operator panel 360 which is mounted on the inside of the cabinet door 352 and which is shown in more detail in FIG. 23. The panel 360 has a number of fullness indicators 362, one for each coin box or other type of compartment in the cash storage receptacle 142. A corresponding number of actuators 364 are provided next to the fullness indicators 362. In the illustrated embodiment, the actuators 364 are buttons, but the actuators may be other suitable devices (e.g., switches, levers, etc.) for actuating the fullness indicators 362 without departing from the scope of this invention. For the described embodiment, which has a coin-counting CAM 226 and does not sort the deposited cash, the number of coin boxes will typically be limited to one or two. For a sorting cash deposit apparatus 1, like the one shown in FIG. 6, the number of coin boxes may typically be up to 8.

Each fullness indicator 362 is able to provide a visual indication which has at least two different states, wherein the different states will represent different degrees of fullness for the associated coin box. In the disclosed embodiment, the fullness indicators 362 are lamps or light emitting diodes (LEDs) having at least the following different states:

A green light means that the associated coin box is empty.

No light means that the associated coin box contains some coins, i.e. is partly but not completely filled.

A red light means that the coin box is full and needs to be emptied or replaced.

When a coin box has been emptied or replaced by the authorized person 141, he may press the associated button 364, wherein the corresponding indicator 362 will change to green and the controller 128 will cause generation of a verification on the operation performed. The verification may advantageously be a printed receipt containing information related to the total value of cash contained in the removed or emptied cash box. Such information is maintained by the controller 128 and may be used as an instrument against miscalculation or fraud when the contents of the coin box are subsequently processed at a remote site, such as a CIT company. Additionally or alternatively, the verification may contain information on an identity of the coin box and/or apparatus 1, the date and time, the location (site) and/or owner of the apparatus 1, etc. The total-value information held by the controller 128 is reset when the button 364 is pressed, to reflect the fact that the emptied or replaced coin box now contains zero value.

One of the buttons, labeled 364', may have a special meaning as a joint reset button for all coin boxes in the apparatus 1.

The panel 360 also contains an in-use indicator 366, which in similarity with the aforementioned in-use indicator of the service user interface 310 will indicate whether there is a cash processing transaction going on or not. In the disclosed embodiment, the in-use indicator 366 is a lamp or LED, where red light means ongoing transaction and green or no light means no transaction going on.

It is to be noted that while it is here described an operator panel 360 being arranged on the inside of the cabinet door 352, it can equally well be placed on the outside of the cabinet door 352, or in any other suitable position.

As appears from the above description, the cash storage interface is all that the authorized person needs. Thus, the authorized person only needs access to the cash storage module 140 to perform his tasks, and in turn this is advantageous particularly for models with a rear-oriented service interface. However, in some embodiments, the cash storage interface 152$_F$ may also involve user interface elements from the user interface module 100 or cash processing module 140, such as the display 102 or printer 230. Particularly if the cash storage interface 152$_R$ is rear-oriented, it may include a separate printer, by means of which the authorized person can obtain his printed receipt as verification of the operations performed by him.

Figure 5:
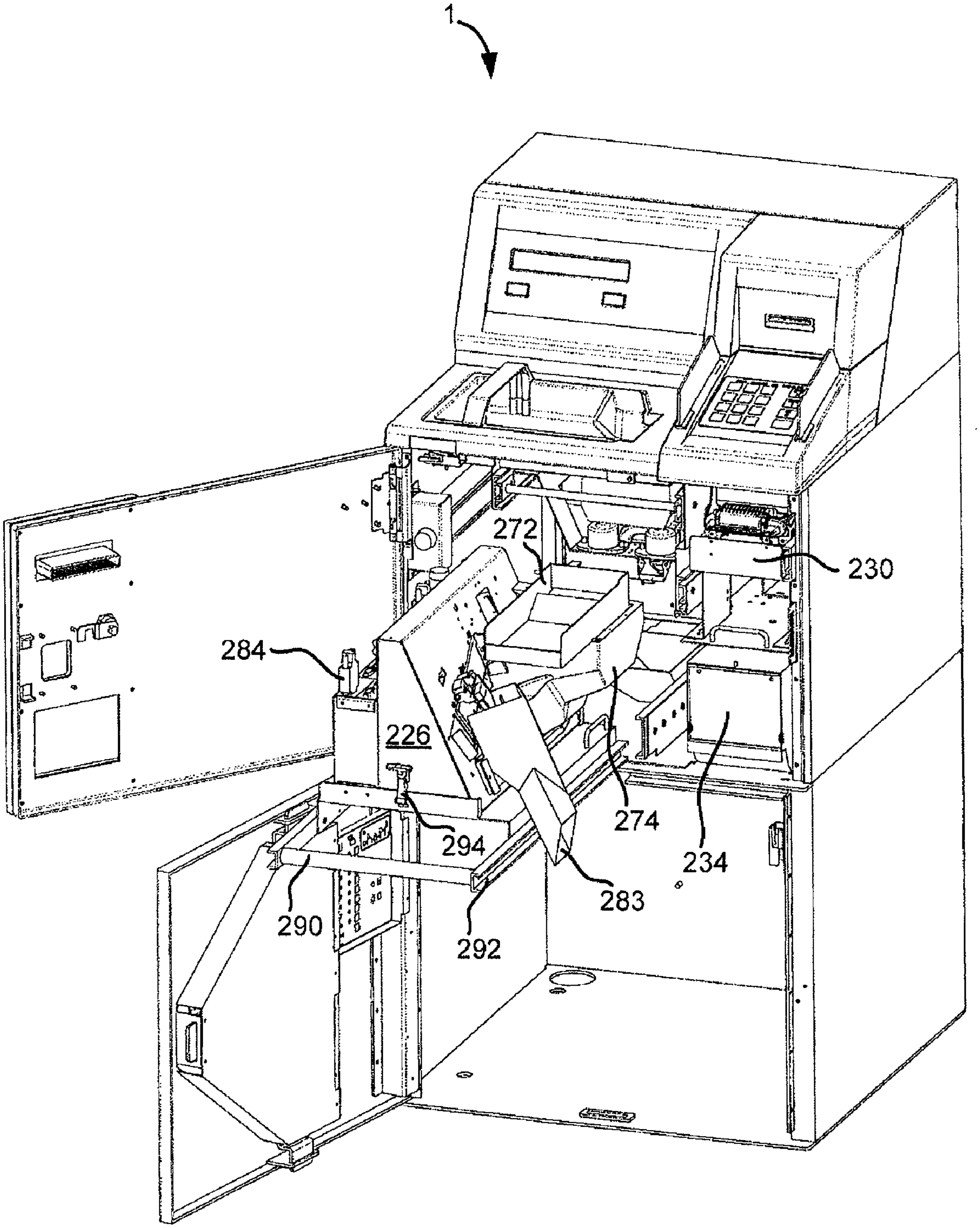
Figure 8:
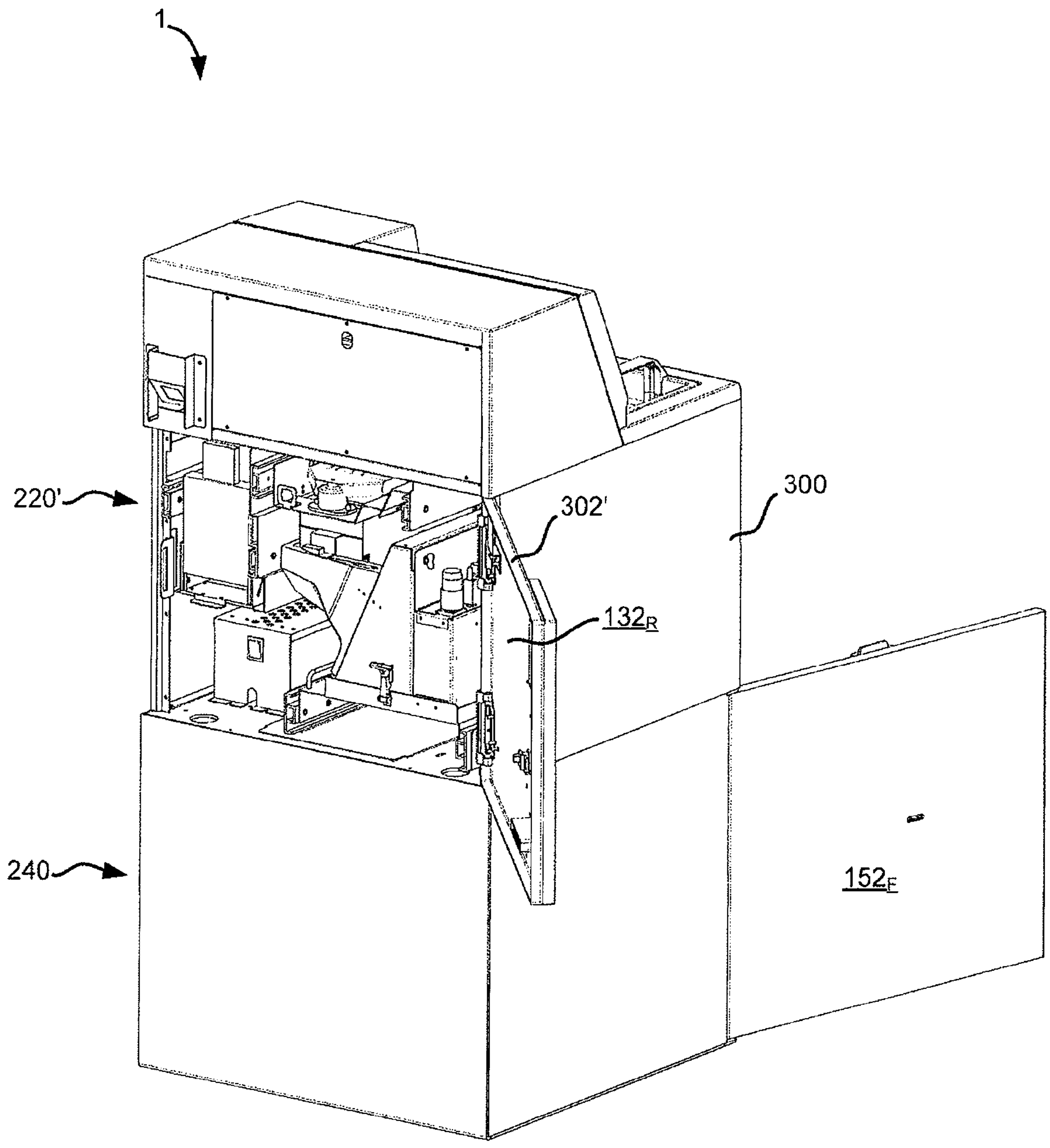
FIG. 8 illustrates a third variation of the embodiment of FIGS. 2-5, being the opposite to the second variation in the sense that the service interface is rear-oriented while the cash storage interface is front-oriented.
Figure 9:
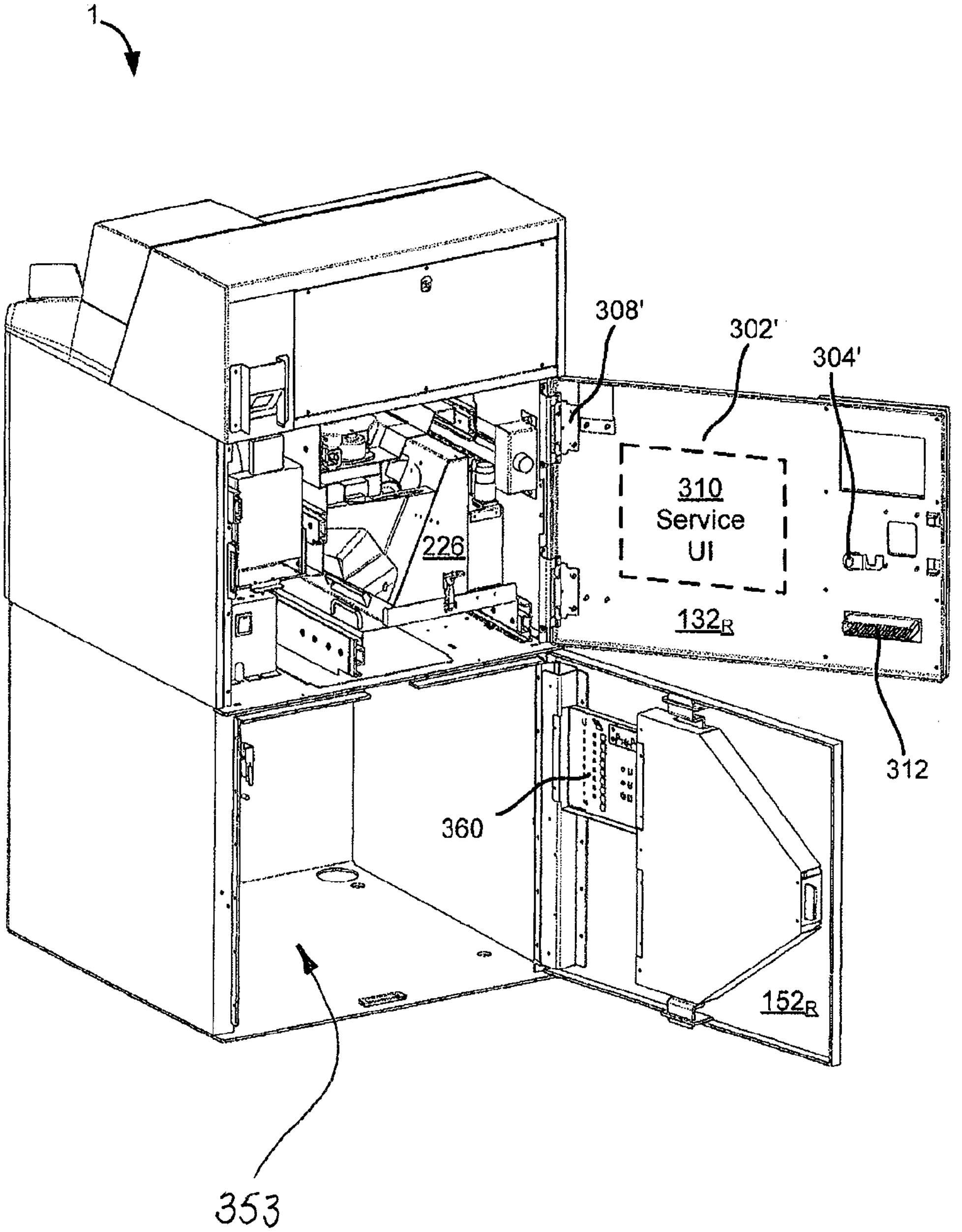
FIGS. 9-11 illustrate a fourth variation of the embodiment of FIGS. 2-5, where both the service interface and the cash storage interface are rear-oriented.
Figure 10:
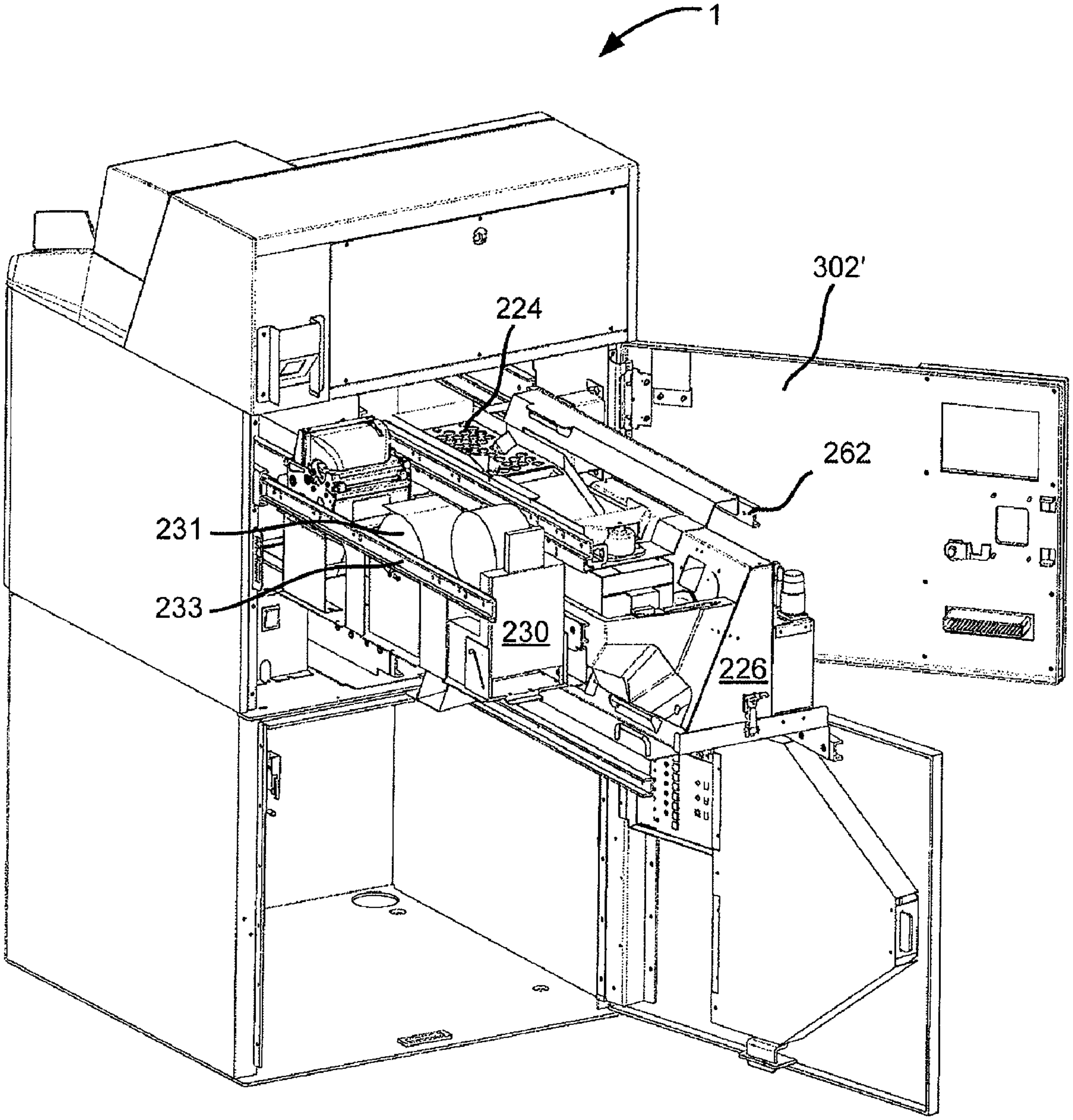
Figure 11:
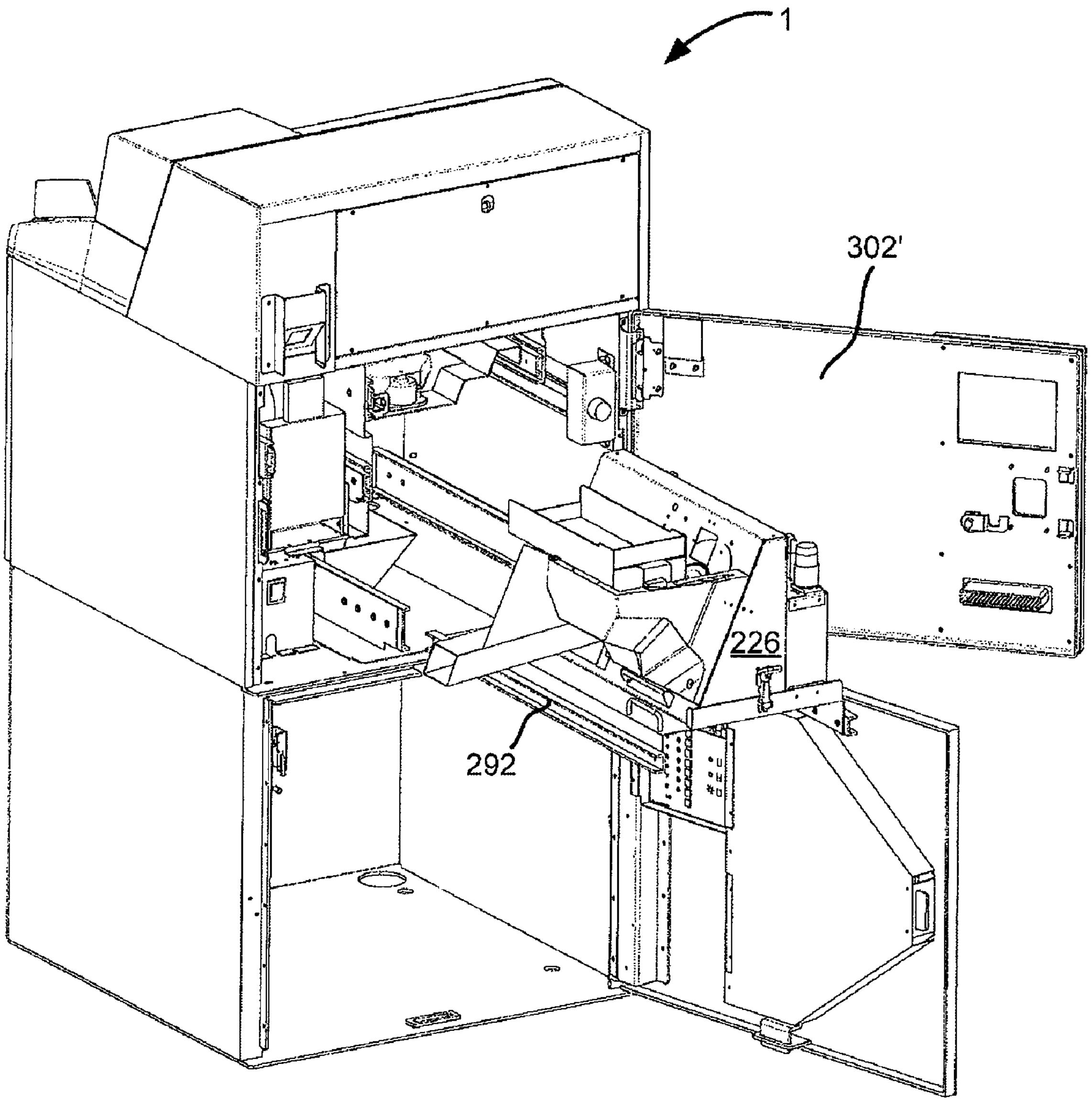

The modular design concept of the invention, with the service interface 132$_F$/132$_R$ and the cash storage interface 152$_F$/152$_R$ being either front-oriented or rear-oriented independently of each other, provides excellent configurability when a new model is to be designed and built. Likewise, excellent upgradeability is offered for existing installations to match changed customer needs as time goes. Depending on the needs in a particular situation (be it at an early stage when a new model of the cash processing apparatus 1 is to be developed, or at a later stage when an existing model needs upgrade), the manufacturer may conveniently provide the apparatus 1 configured with its cash processing module 220/220' having a front-oriented service interface 132$_F$ and its cash storage module 240/240' having a rear-oriented cash storage interface 152$_R$ (like in FIG. 7), or the other way around (132$_R$, 152$_F$; FIG. 8), or both front-oriented (132$_F$, 152$_F$; FIG. 2), or both rear-oriented (132$_R$, 152$_R$; FIG. 9). To this end, the cash processing module 220/220' has internal frame and support structure (broadly "supports") which not only safely receive and mount the internal elements inside the module 220/220' but in addition make it very easy to change the positions thereof to adapt the module 220/220' for front-oriented or rear-oriented access. Such supports include, for instance, rails 262 for ACC 224 and rails 233 for printer 230 (FIG. 4 and FIG. 10), or rails 292 for CAM 226 (FIG. 5 and FIG. 11). The cash storage module 240/240' may also have suitable internal frame and support structure for conversion between front-oriented access and rear-oriented access.

Figure 22:
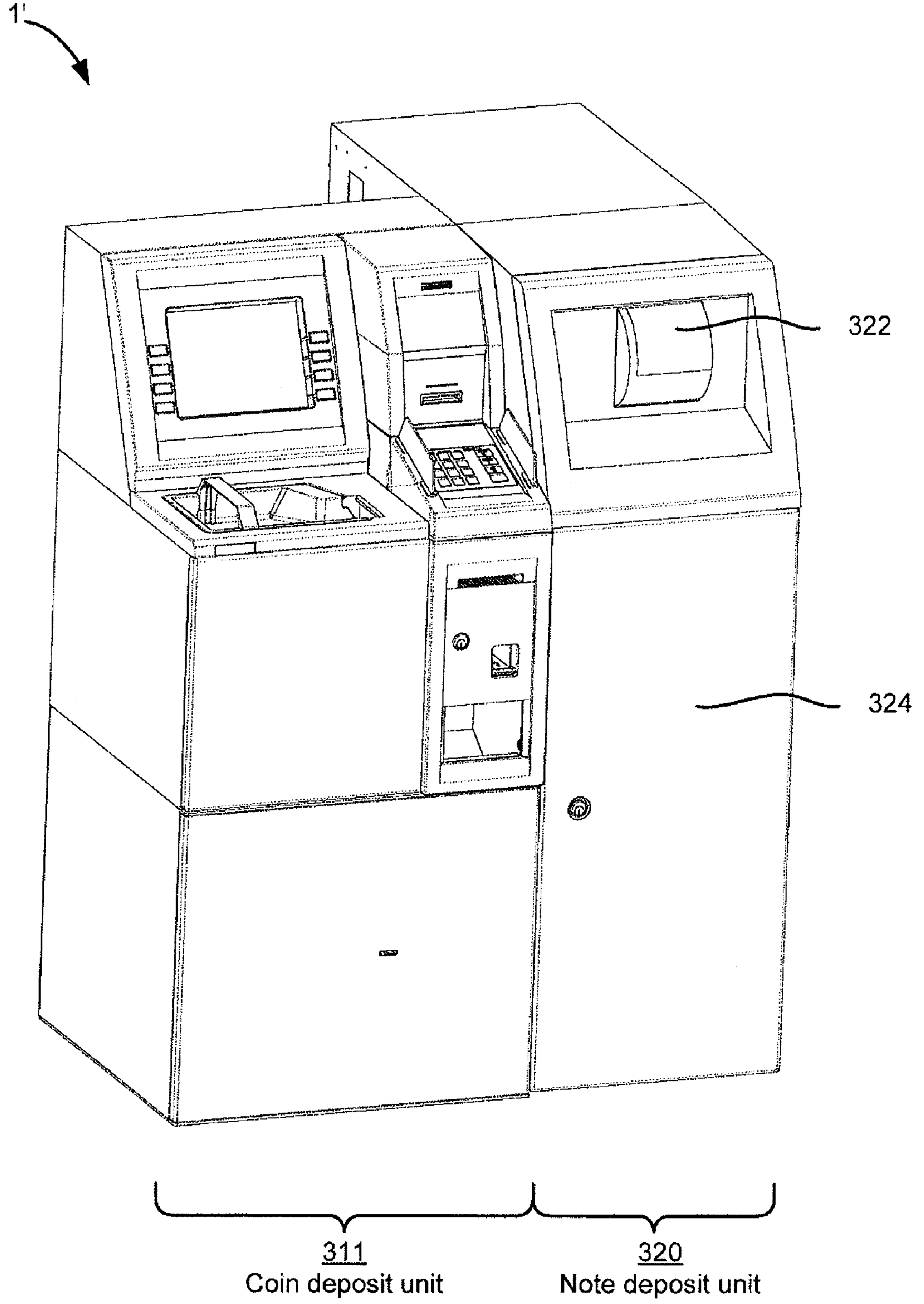
FIG. 22 is a perspective front view of a cash deposit apparatus according to a fifth embodiment, which consists of the first embodiment of FIGS. 2-5, including the coin-counting cash acceptance module thereof, and an attached note deposit unit having a note processing module for note validation, and an associated note storage module.

In addition, excellent configurability and upgradeability is offered by making also the user interface module 100 exchangeable. See for instance FIGS. 19 and 20 which present two alternative different versions 200' and 200" of the user interface module which can substitute the module 200 of e.g. FIG. 2 to match the needs in a particular situation by offering more advanced user interface elements (display 202', 202" and keys 204"). Another example is shown in FIG. 22, where a coin deposit unit 311 (which may be an existing cash deposit apparatus 1 like the one shown in FIG. 2) is provided with an additional note deposit unit 320, thereby creating a cash deposit apparatus 1' for both coins and notes. The note deposit unit 320 has a note processing module 322 for note validation, and an associated note storage module 324. Within the modular design concept of the invention, the controller 128 and the user interface provided by the user interface module 100 are designed to work also with a note deposit unit 320, if one is installed.

Figure 6:
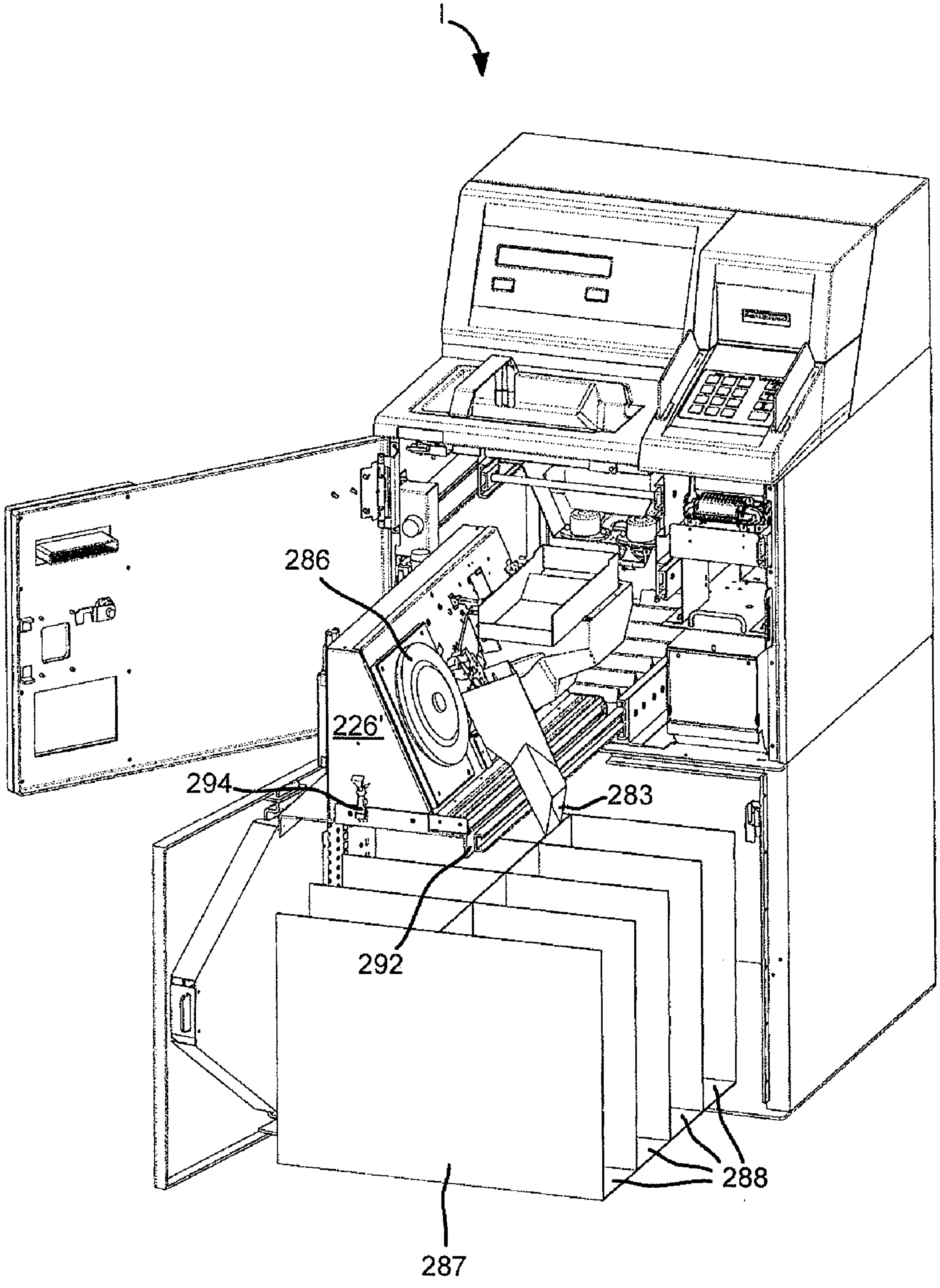
FIG. 6 illustrates a first variation of the embodiment of FIGS. 2-5, where the coin-counting cash acceptance module has been replaced with a coin-sorting cash acceptance module and a plurality of coin boxes for different coin denominations are provided in a cash storage module.
Figure 7:
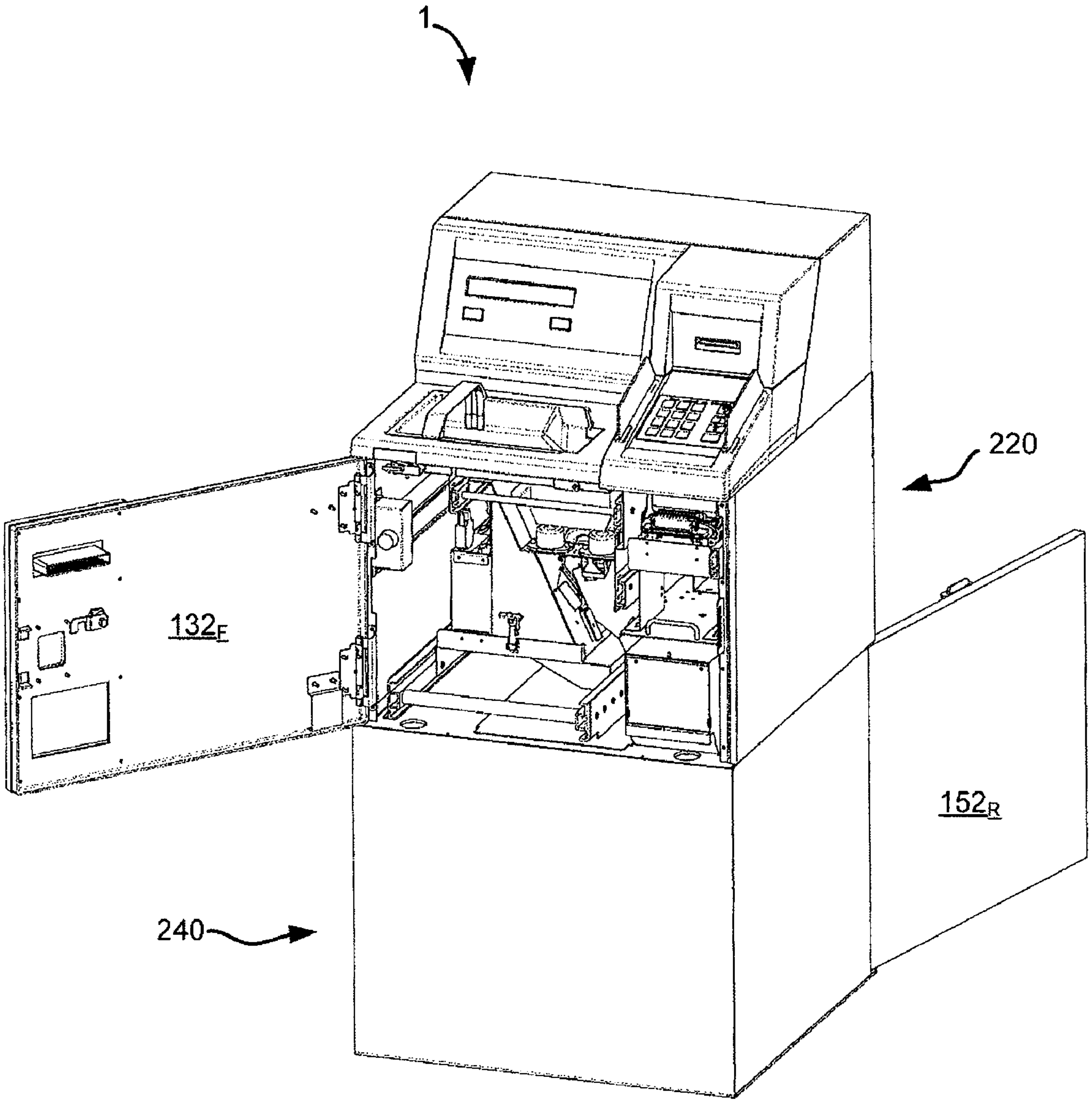
FIG. 7 illustrates a second variation of the embodiment of FIGS. 2-5, where the service interface is kept front-oriented but the cash storage interface is instead rear-oriented.

On an element level, the modular design concept of the invention, and the aforementioned internal frame and support structure, offer excellent configurability and upgradeability, as well as serviceability. For instance, an existing coin-counting CAM 226 in the cash deposit apparatus 1 of FIGS. 2-5 may be substituted by a coin-sorting CAM 226', as is shown in FIG. 6.

The coin-sorting CAM 226' is designed to operate like the coin-counting CAM 226 described above, but with a sorting unit 286 mounted on the front plate 278 at the lower end of the coin rail 280. The sorting unit 286 will therefore receive valid coins that have been duly discriminated at the coin sensor unit 282 (invalid coins being deflected through reject channel 283). The received coins will be transported by a rotary carrier disc along a circular sorting path across a series of openings in the front plate 278. The openings are of increasing size, such that coins of a smallest diameter will fall down through the first opening in the transport direction, whereas coins of the second smallest diameter are separated through the next opening, etc. A channel system at the back of the front plate 278 will guide the thus sorted coins into the secure cash storage chamber 353, and into the correct compartments 288 of a multi-denomination coin storage receptacle 287 housed within the secure storage chamber 353. According to exemplary embodiments, the receptacle(s) 287 of are selectively removable from the chamber 353 through the cash storage interface door 152/352. The receptacle 287 may for instance be a single coin box having several slots for the different denominations, or may be a coin trolley, etc, supporting a plurality of individual coin boxes, etc.

The steps required to replace the existing CAM 226 are in fact very simple, as is illustrated by the following example with reference to the embodiment of FIGS. 2-5:

1. The service person 121 arrives at the apparatus 1, unlocks the cabinet door 302 by way of the lock 304, and opens it.

2. The automatic mode switch functionality automatically enters service mode for the user interface.

3. By pulling the handle 290, the service person 121 withdraws the existing CAM 226, supported for slidable extension by way of the rails 292.

4. Elastic fastening straps 294 are released, and the existing CAM 226 is removed.

5. The new CAM 226' (FIG. 6) is mounted on the rails 292, and the fastening straps 294 are applied.

6. If the existing coin storage receptacle is not suitable for receiving sorted coins, the cabinet door 352 of the cash storage module 240 is opened, and the existing receptacle is replaced by the new receptacle 287 of FIG. 6 (this step may require cooperation with an authorized person 141).

7. The new CAM 226' is brought to its retracted position inside the cash processing module 220, the license device 284/421 from the existing CAM 226 is removed and fitted to the new CAM 226', and door 302 is closed and locked (as well as door 352, if applicable)

8. Auto-configuration functionality provided by the controller 128, and described in more detail below, automatically identifies the type of the new CAM 226' and makes any configurations that may be required. Any manual input needed for this may be provided by the service person 121 through the aforementioned service user interface.

9. When the installation is completed, the apparatus 1 returns to normal (end-user) mode.

Other elements such as the ACC 226 or printer 230 may conveniently be substituted in similar ways.

Figure 18:
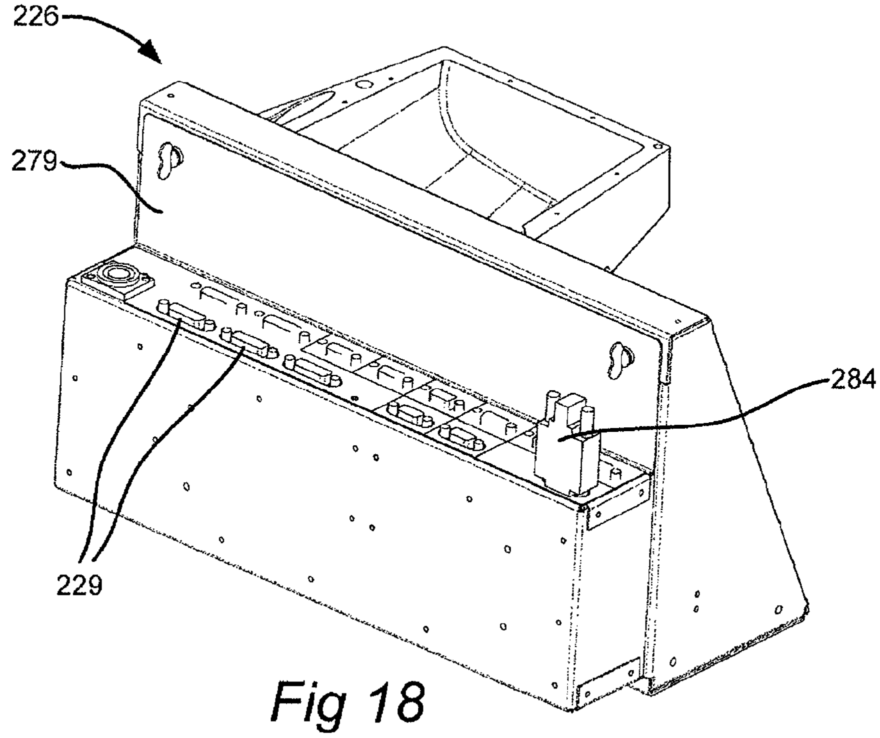
Figures 24, 25:
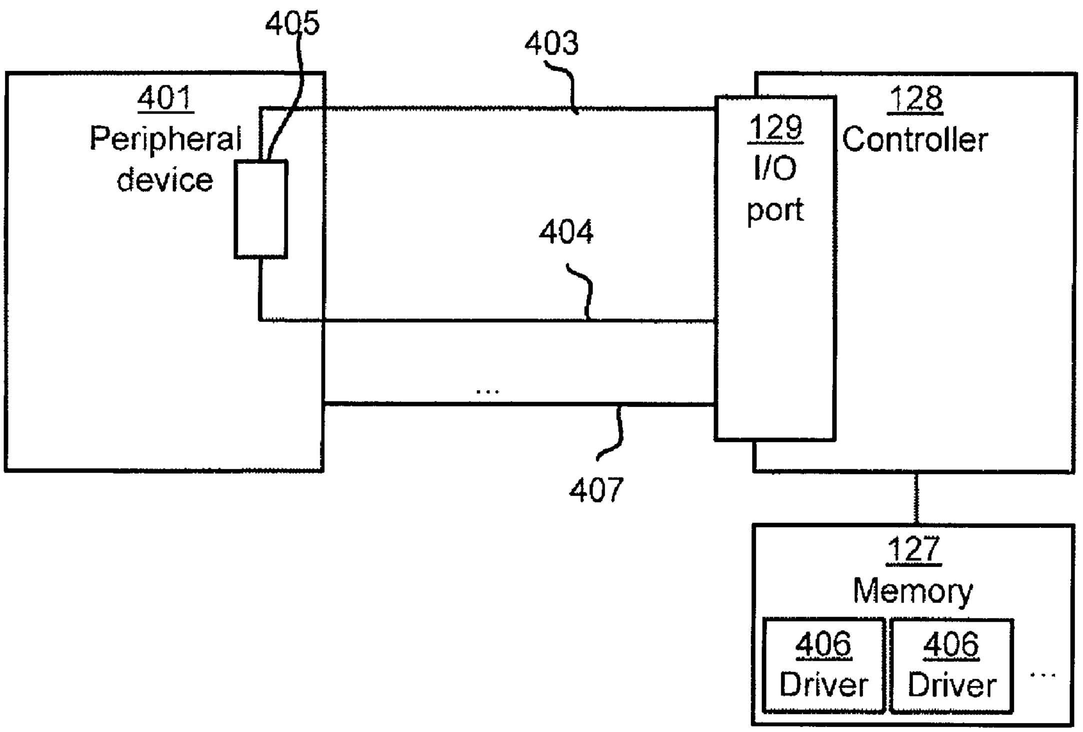
FIG. 24 is a schematic diagram of a peripheral device, adapted to auto-configuration functionality, connected in a cash deposit apparatus in one embodiment of the present invention.
FIG. 25 shows an exemplifying table used for auto-configuration functionality of a peripheral device connected in a cash deposit apparatus in one embodiment of the present invention.

As can be seen in FIG. 1 and FIG. 18, there are a number of I/O ports 129/229 where peripheral devices, such as printers 230, displays 102, keys 104, etc., can be connected. In one inventive aspect, the cash deposit apparatus 1 is adapted to recognize and configure itself to communicate with any new peripheral devices without requiring any user input, in accordance with auto-configuration functionality explained in more detail below. FIG. 24 shows a schematic diagram of a peripheral device 401 connected to the controller 128 in the cash deposit apparatus 1 according to one embodiment of the present invention. A connection 403, 404 between the peripheral device and one I/O port 129 of the cash deposit device may be a wire-based connection, such as a RS232 serial interface, a Centronics parallel interface, a universal serial bus (USB) interface, or a FireWire interface, or the peripheral device may be connected using a wireless interface, such as a wireless universal serial bus interface (WUSB), or a Bluetooth interface.

The peripheral device 401 comprises an identifier unit 405, allowing the controller 128 to identify the peripheral device 401 when it is connected.

The identifier unit may be a digital unit, whereby a digital identifier or signal is transmitted from the peripheral device 401 to the controller, either spontaneously or when queried by the controller.

Alternatively, the identifier unit 405 may be an analog component or circuit. The peripheral device 401 is connected to the controller 128, with at least connectors 403 and 404. In most cases, several other connections 407 exist between the peripheral device 401 and the controller 128, but in one embodiment, only two connectors are used both for identifying purposes and subsequent signal transfer. The identifier unit 405 may be any measurable component, such as a resistor, a capacitor, an inductor or a combination of these components. The identifier unit 405 has the same characteristics for peripheral devices 401 of the same type. For example, all monochrome displays with two 40-character rows may have an identifier unit 405 in the form of a resistor of 1,000 ohms, plus or minus any fault tolerance. In this way, the controller 128 can identify the peripheral device 401 by measuring the identifier unit 405. For example, the controller 128 may measure an analog value such as the resistance of the identifier unit 405 using the connectors 403 and 404, whereby a value of about 1,000 ohms implies that the connected peripheral device 401 is a display with two 40-character rows. As a man ordinarily skilled in the art will realize, the resistor can easily be replaced by a capacitor, an inductor, or any other identifier unit 405 that can provide a signal or output measured by the controller 128.

Once a value of the identifier unit 405 is determined, the controller 128 may look in a reference table, such as a reference table 416 in FIG. 25, to determine the type of peripheral device 401 the measured value corresponds to. The reference table 416 in this embodiment has a first column 417 indicating a lower limit and a second column 418 indicating an upper limit for the values that are to be interpreted as a peripheral type identity ("type ID) in a third column 419. For example, a value (which may be any measurable value) of 365 indicates that a peripheral device with type identity 160 is connected, while a value of 954 should be interpreted as a peripheral with type identity 344. It is to be noted that any reference table that allows a value to be interpreted as a peripheral type identity is in the scope of the invention. For example, the table may have a first column with an identifier unit value, and a second column with a peripheral type identity. This table could then be used such that any measured value is considered to be a match with the value in the first column which is closest to the measured value.

Once the peripheral device 401 is identified, the software executing in the controller 128 may load any required driver (s) 406 from memory 128 to properly configure the cash deposit apparatus 1 and allow communication with the peripheral device. Additionally, the controller 128 is thus capable to keep track of what peripheral devices are connected to the controller 128, and can adapt the behavior of the cash deposit apparatus 1 accordingly. For example, three printers with three different peripheral type IDs may be connected. The printers have different intended functions: the first printer is a customer receipt printer, the second printer is a printer used when emptying the machine and the third printer is a journal printer. As the three printers have different IDs, the controller 128 knows how to use the printers for the different purposes. In this example, all three printers thus are treated differently, even though they can all have the same drivers.

Figure 12:
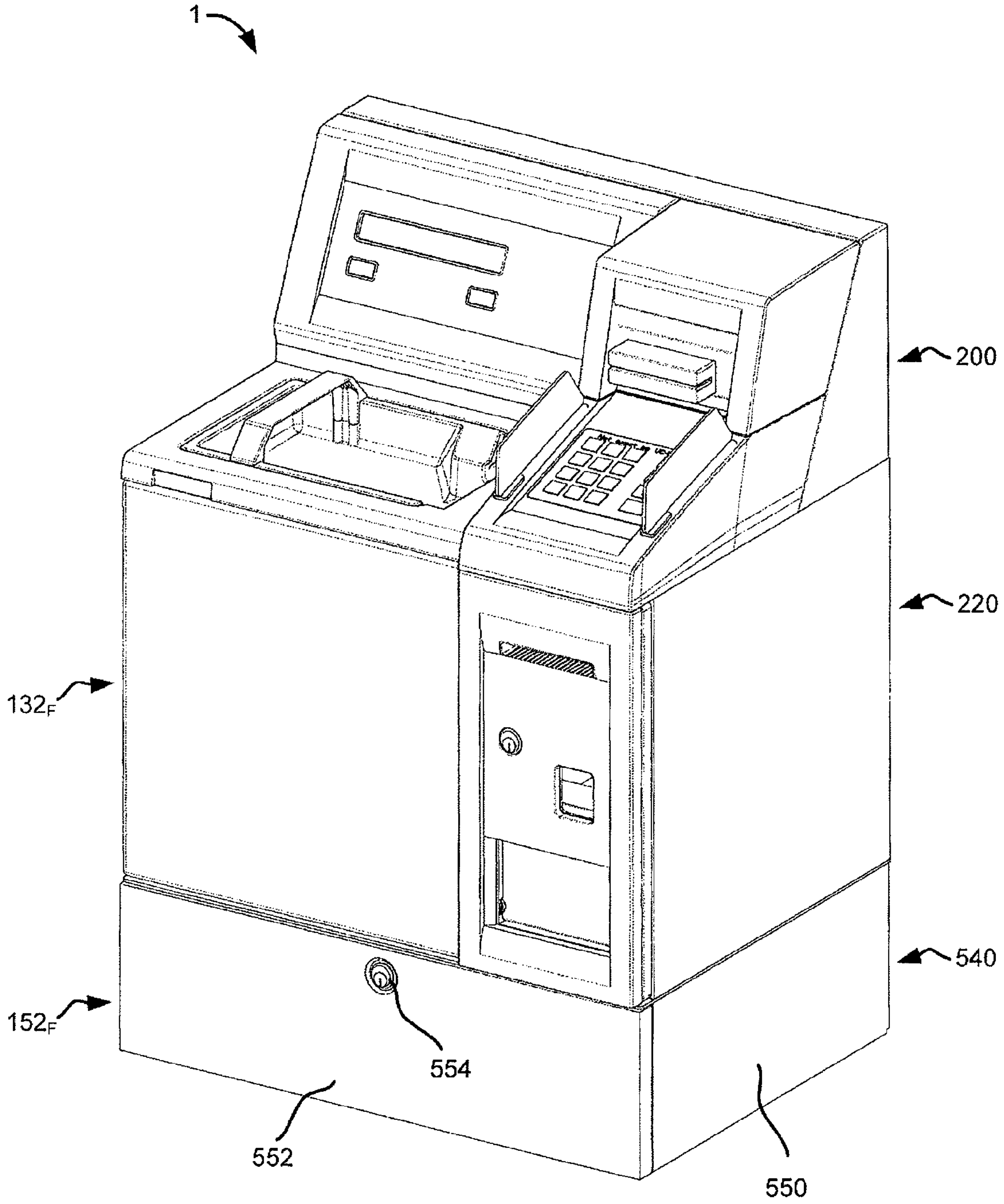
FIGS. 12-14 are perspective front views of a cash deposit apparatus according to a second embodiment, which is essentially identical to the first embodiment of FIGS. 2-5 except that is has another cash storage module at the base of the apparatus.
Figure 13:
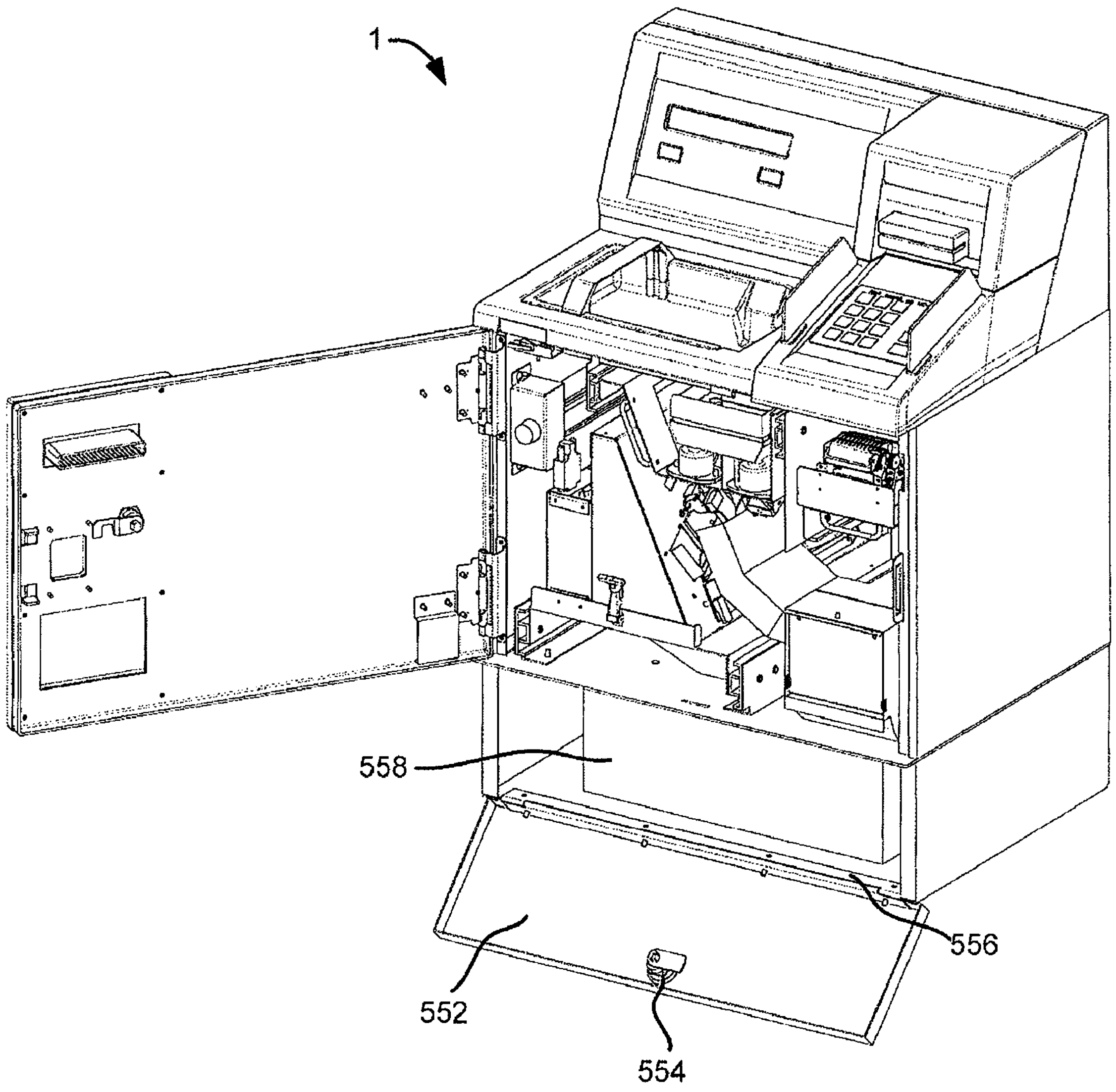
Figure 14:
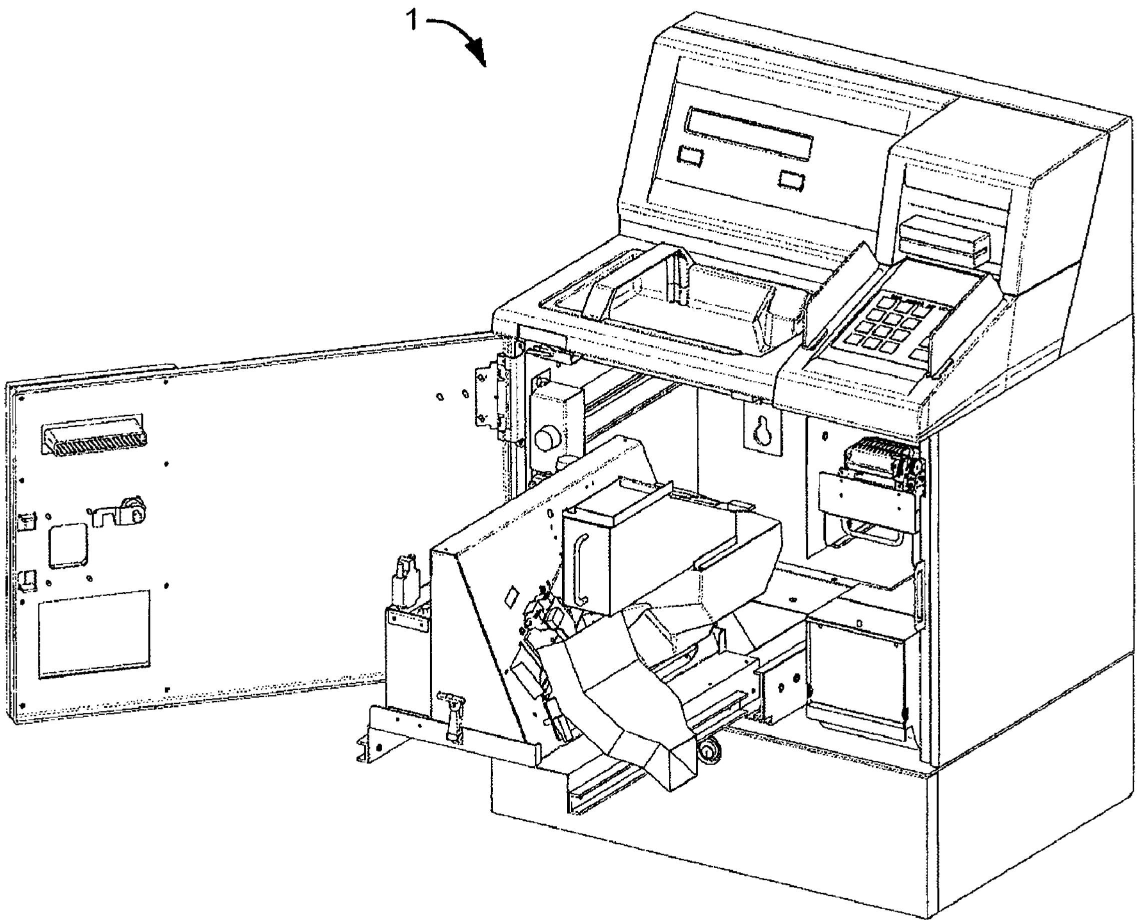

FIGS. 12-14 shows a cash deposit apparatus 1 according to a second embodiment. The user interface module 200 and cash processing module 220 are essentially identical to those of the first embodiment shown in FIGS. 2-5. The cash storage module 540 at the base of the apparatus 1 is however different and, in particular, considerably smaller and more suitable for low-end models. As is best seen in FIG. 13, the front part 552 of the box-shaped cash storage module 540 is lockable (554) and hinged (556) to the rest 550 of the module 540. A compact-sized coin box 558 is contained inside the module 540.

Figure 15:
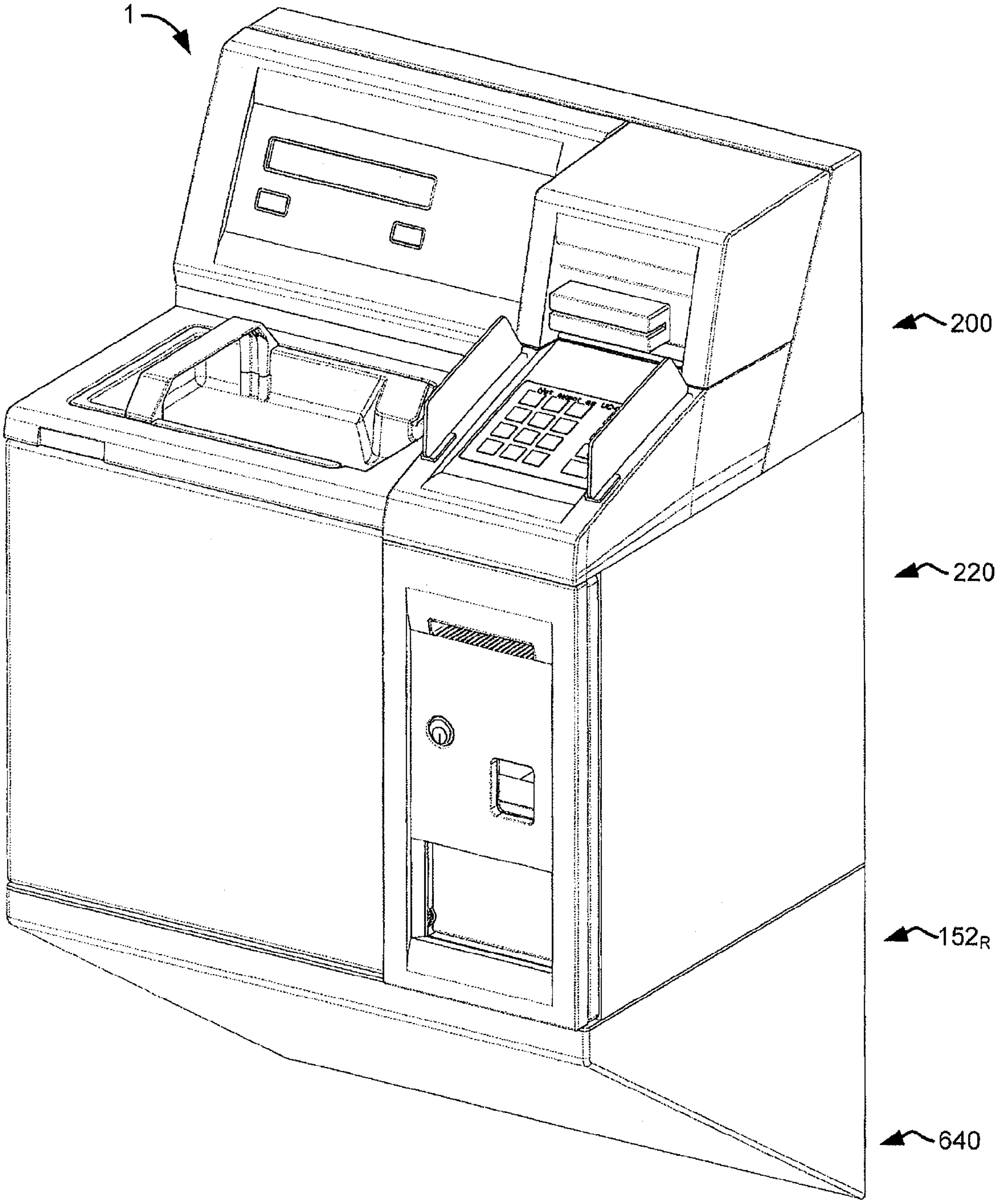
FIG. 15 is a perspective front view of a cash deposit apparatus according to a third embodiment, which is essentially identical to the second embodiment of FIGS. 12-14 except that is has a different cash storage module at the base of the apparatus and is particularly adapted for through-the-wall installation.

A third embodiment of the cash deposit apparatus 1 is shown in FIG. 15. The third embodiment has yet a different cash storage module 640 at the base of the apparatus and is particularly adapted for through-the-wall installation. Thus, the cash storage interface $\mathbf{152}_R$ is rear-oriented and accessible from another room than the area in which the apparatus 1 is installed.

Figure 16:
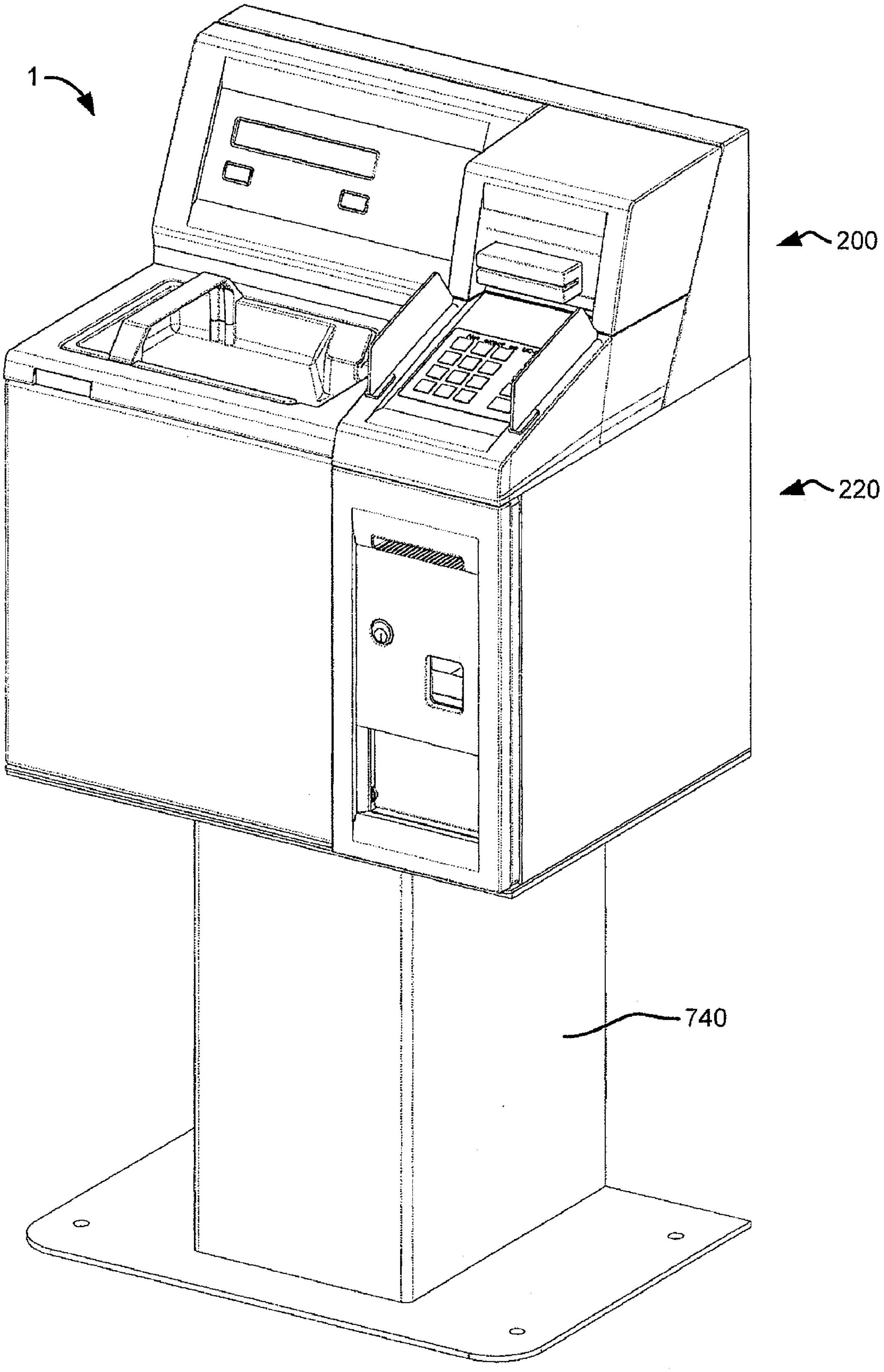
FIG. 16 is a perspective front view of a cash deposit apparatus according to a fourth embodiment, which is essentially identical to the second embodiment of FIGS. 12-14 except that it is supported by a pedestal at the base of the apparatus.

A fourth embodiment is shown in FIG. 16, essentially identical to the second embodiment of FIGS. 12-14 except that it is supported by a pedestal 740 at the base of the apparatus.

Figure 26:
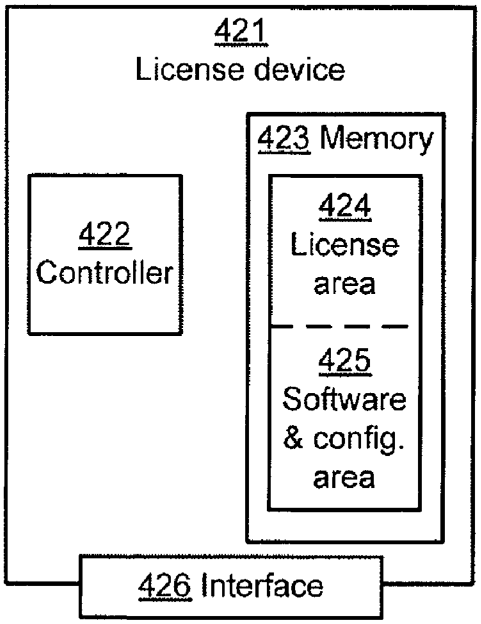
FIG. 26 is a schematic diagram of a license device according to one embodiment of the present invention.

One inventive aspect involves the aforementioned license device 284, one embodiment of which is illustrated in FIG. 26, with reference numeral 421. The license device 284/421 is a hardware unit which connects to the controller 128 in the cash deposit apparatus 1 via an interface 426. The connection may be a wire-based connection, such as a RS232 serial interface, a Centronics parallel interface, a universal serial bus (USB) interface, or a FireWire interface; or the interface may be a wireless interface, such as a wireless universal serial bus (WUSB) interface, a Bluetooth interface; or a custom made interface. The license device 284/421 comprises a controller 422, which may be a microcontroller, a central processing unit, or constructed from discrete components, and memory 423 which may be a RAM, ROM, EEPROM, flash memory, hard disk, or any combination thereof. The memory 423 comprises one license area 424 and one software and configuration area 425. In the license area, license information is stored, such as license keys, which is used by the controller 128 so that only software functions in the cash deposit apparatus 1 that corresponds to what the customer has paid for are enabled. This allows the same software to be distributed to many cash deposit apparatuses, and still provide the respective customers with a choice of what functions to pay for. In other words, the license device 284/421 controls what software functions are enabled in the cash deposit apparatus 1, even though all functions are technically present in the cash deposit apparatus 1. For example, customers may be given the option to purchase network connectivity, web server functionality, ability to handle multiple currencies, remote configuration, status reporting over SMS, etc. In this way different products within the same family may be delivered with the same software, and the license device 284/421 will govern what functions in the software are enabled and what functions are disabled. In one embodiment the software functions may only be enabled by using license keys provided in the license device. In another embodiment, the license device is one of a plurality of ways the licenses may be distributed.

Furthermore, the license device 284/421 contains information about what model the connected cash deposit apparatus 1 is. Such information may for instance be: "cash deposit apparatus with coin-counting CAM, large cash storage module and an attached note deposit unit. Additionally, the license device 284/421 can contain most data relating to the device, such as configuration and run-time data such as journal, box contents, software, etc. If the license device 284/421 is moved from a first CAM 126/226 to a second CAM 126/226, the second CAM 126/226 behaves just like the first apparatus, hardware configuration permitting. This is advantageous for example in a situation where a user of a coin deposit apparatus needs a replacement of the CAM 126/226. A compatible second CAM 126/226 is then delivered, the license device 284/421 is moved to the second CAM 126/226, whereby the second CAM 126/226 functions just like the original one without any need for reconfiguration, etc.

In one embodiment, the license device 284/421 may also be used as a convenient way to provide software updates. The new software is then stored in the software and configuration area 425 of the license device 284/421 and when the controller 128 detects the license device 284/421, either during the boot process of the cash deposit apparatus 1 or upon connection of the license device 284/421, the cash handling apparatus detects that there is a software update on the license device 284/421.

In one embodiment, the controller then compares version numbers of the software modules being present on the license device 284/421 and copies the software to the memory 127 in the cash deposit apparatus 1 using the controller 128, for those software modules where a newer version exists on the license device 284/421. This ensures that the cash deposit apparatus 1 always has the latest software possible.

In another embodiment, the controller 128 always copies the software modules being present on the license device 284/421 to the cash deposit apparatus 1. This ensures that the license device 284/421 always controls what software version is executed in the cash deposit apparatus 1.

Additionally, the license device 284/421 may contain configuration data in the software and configuration area 425 for the cash deposit apparatus 1, such as texts for any of its user interfaces, exchange rates, reporting conditions, receipt configuration, etc. Moreover, such configuration data may advantageously include reference data to be used by the coin sensor unit 282 in the CAM 226 when discriminating deposited coins.

When the CAM 126/226 is started up, it checks with the attached license device 284/421 if any updates need to be done to synchronize the license device with the cash processing module. For example, the CAM 126/226 checks if there is newer software on the license device 284/421, in which case the newer software is copied to the CAM 126/226 and used during the current power cycle. After software, the CAM 126/226 checks the license device 284/421 if there is any new configuration data stored on the license device 284/226, in which case any newer configuration is copied to the CAM 126/226 and used during the current power cycle. After configuration, the CAM 126/226 checks the license device 284/421 if there is any new run-time data stored on the license device 284/226, in which case any newer run-time data is copied to the CAM 126/226 and used during the current power cycle.

Once the CAM 126/226 is running and any configuration is changed, this configuration is also written to the license device 284/421. Run-time data, such as number of coins in containers, is somewhat more complex, and can for example be implemented by coin counting and license device communication taking place in separate, communicating, operating system tasks/threads.

Figure 27:
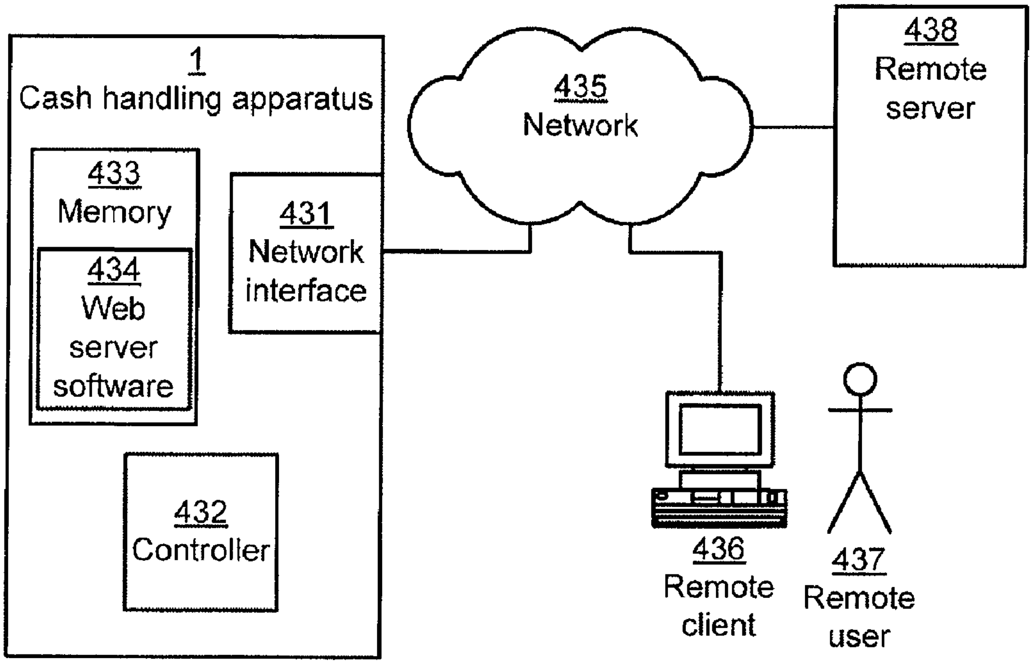
FIG. 27 shows an environment where one embodiment of the present invention can be applied.

As illustrated in FIG. 27, in one embodiment of the invention, the cash deposit apparatus 1 can be connected to a network 435, such as a local area network (LAN) or a wide area network (WAN) such as the Internet, through a network interface 431. The connection may be implemented using wire based technologies, such as Ethernet, DSL, modem connection, Token Ring, etc. or wireless technologies such as Wireless LAN (WLAN), Worldwide Interoperability for Microwave Access (Wimax), GSM/GPRS, UMTS, CDMA2000, etc. Furthermore, the cash deposit apparatus 1 may comprise a web server utilizing the Hypertext Transfer Protocol (HTTP). The web server is comprised by web server software 434, preferably stored in the memory 433 of the cash deposit apparatus 1, and executed by the controller 432 (which may be the controller 128 of the previous drawings). The web server provides an interface to the cash deposit apparatus 1 from a remote client 436, such as a desktop computer, a laptop computer, a Personal Digital Assistant (PDA), or a mobile phone. Preferably, access to the cash deposit apparatus 1 is restricted, either to certain IP addresses corresponding to the site of a company (e.g. a CIT company) being responsible for servicing the apparatus and/or a company being responsible for the cash logistics, and/or by requiring login. The login may be static or dynamic, where the remote user has to use a code generated by a code generator as is well known in the art. Alternatively or additionally, login may be restricted to browsers having a valid certificate. Virtual Private Network (VPN) technology may also be used to enhance the security of the connection.

The interface provided by the web server allows a remote user 437 to interact with the cash deposit apparatus 1 to perform a number of tasks. For example, information may be retrieved, such as the fill level of coin storage receptacles, status of elements or components within the apparatus, hours of operation, time of last emptying, number of end-users served, etc. Additionally, the operation of the apparatus may be configured or controlled using the web interface. For example, a reject frequency of the apparatus may be tuned or new software modules may be uploaded to replace software currently running on the apparatus. Optionally, while a remote user is servicing the apparatus, end-user access can temporarily be blocked with a message on the display indicating that the apparatus is currently being serviced to the end-user.

The network enabled cash deposit apparatus 1 may also comprise a file transfer protocol (ftp) server. This server may for example be used to upload new software to the apparatus or to retrieve log files.

The web server/browser and ftp architecture above is an example of "pull" access to the apparatus 1, where the remote user 437 initiates the communication. However, "push" access, where the apparatus initiates communication to a remote party, is equally possible with the network enabled cash deposit apparatus 1. Messages can then be sent from the apparatus 1 to a remote user or machine using an appropriate technology, such as electronic mail (e-mail), Short Message Service (SMS) or Multimedia Message Service (MMS).

For example, for cash logistic optimization, the apparatus 1 may send a message to a remote user, or a remote computer of the company responsible for cash collection, when fill levels of one or more cash storage receptacles exceed a threshold level, e.g. 75% of full capacity. In this way, unnecessary travel to collect cash from apparatuses where not much cash has been deposited is reduced and efficiency is improved. Another use is for the apparatus 1 to send a message to one or more recipients if the apparatus fails and becomes inaccessible to end-users. Optionally, a help button may be provided to the end-user, wherein if the help button is pressed, a message is sent to customer service personnel who can go and help the end-user.

While the network transfer technologies of http, ftp, SMS, MMS and e-mail have been mentioned above, any suitable transfer technology is applicable and within the scope of the present invention.

Receipts for several purposes may be printed by the printer 230 controlled by the controller 432 which is configured to print the receipts based on a configurable definition of a receipt type saved in the memory 127. Receipts may for example be printed to provide the end-user 101 with a redeemable voucher, to print cash volume/value receipts to the CIT personnel 141 indicating the volume and/or value of the cash removed, or to provide service personnel 121 with the status or any errors of the machine.

In one inventive aspect, the apparatus 1 is capable of providing any required receipt type, and each receipt type is fully configurable. Each receipt type may comprise any combination of text, data fields, graphics, (such as logos, etc.), and barcodes, in any position. The barcodes need not be the same for different receipt types; for example, the end-user voucher may have a barcode according to a first barcode format and the CIT receipts may have a barcode according to a third barcode format. If a receipt type is configured to print errors, error codes along with a full text explanation of the error code may be printed. It is to be noted that in the case of an error, the error code along with the full text explanation may also be presented on the display 102.

In one embodiment of the invention, the cash handling apparatus 1 is adapted to accept cash in one currency and provide credit (as a receipt/voucher, to an account, or to a data carrier, etc.) in another currency. If the end-user 101 is identified, for example by reading a data carrier like a card in the card reader 106, the exchange rate and/or commission may be adjusted according to the end-user. For example, if the end-user is a high volume customer, the commission may be reduced, or even waived. The cash handling apparatus 1 has the ability to convert between two currencies of any suitable number of currencies, e.g. three, four or more currencies.

In one embodiment of the invention, the user interface for the end-user 101 is internationalized and is available in a plurality of languages. In one embodiment, when the end-user 101 approaches the cash deposit apparatus 1, the user interface is provided in a default language, which may be configured by service personnel 121, but still allowing the end-user 101 to change the language for the user interface for the current session. In another embodiment, the user interface is initially presented in a plurality of languages, whereby the end-user 101 first has to select a language. For example, the end-user 101 is provided with labels such as "For English, press here", "Pour Francais cliguez ici", "Für Deutsch klicken Sie hier", etc, where each label is presented next to a key 104. Optionally, if the end-user 101 does not select a language, a default language is used. In one embodiment, texts for four languages are stored in the memory 127 and may either be configured from the service interface 132, remote site 436/438 or transferred from a license device 284/421.

While the present invention was primarily described by way of reference to embodiments of a cash deposit apparatus having a coin-counting CAM, it is to be noticed that it may equally well be applied to other kinds of cash deposit apparatuses, including but not limited to ones that are designed for coin sorting, note counting, note validation, note sorting, cheque validation, voucher validation, marker counting, marker sorting, token counting or token sorting.

Other embodiments than the ones disclosed above are of course possible within the scope of the appended claims, as is readily realized by a person skilled in the art.

The foregoing description of the invention illustrates and describes various embodiments of the present invention. As various changes could be made in the above constructions without departing from the scope of the invention, it is intended that all matter contained in the above description or shown in the accompanying drawings shall be interpreted as illustrative and not in a limiting sense. Furthermore, the scope of the present invention covers various modifications, combinations, and alterations of the above-described embodiments that are within the scope of the claims. Additionally, the disclosure shows and describes only selected embodiments of the invention, but it is to be understood that the invention is capable of use in various other combinations, modifications, and environments and is capable of changes or modifications within the scope of the inventive concept herein, commensurate with the above teachings, and/or within the skill or knowledge of the relevant art. Further certain features and characteristics of each embodiment may be interchanged and applied to other embodiments of the invention without departing from the scope of the invention.

What is claimed is:

1. A cash deposit apparatus comprising:

a user interface module adapted to provide a user interface at a first external side of said cash deposit apparatus for allowing a user to interact with said cash deposit apparatus to transact a cash processing transaction;

a cash processing module adapted to process, including at least to discriminate and to count, cash as deposited by said user for said cash processing transaction and to determine a value related to the processed cash, the cash processing module having a service interface for providing access to said cash processing module; and a cash storage module having a secure cash storage chamber, said cash storage module being adapted to receive and store in said cash storage chamber cash processed by the cash processing module, the cash storage module having a cash storage interface providing access to said cash storage chamber, wherein the cash processing module being independently configurable between a first cash processing module configuration wherein said service interface provides access to said cash processing module wherein said service interface provides access to said cash processing module from a second external side of said cash deposit apparatus, said second external side being different from said first external side, the cash storage module being independently configurable between a first cash storage module configuration wherein said cash storage interface provides access to said cash storage chamber module from said first external side of said cash deposit apparatus and a second cash storage module configuration wherein said cash storage interface provides access to said cash storage chamber from a third external side of said cash deposit apparatus, said third external side being different from said first external side, and the service interface and the cash storage interface being configured to prevent access to the cash processing module and the cash storage module during an ongoing cash processing transaction.

2. A cash deposit apparatus as defined in claim 1, wherein said third external side coincides with the second external side.

3. A cash deposit apparatus as defined in claim 2, wherein the first external side is a front cabinet side of said cash deposit apparatus, and the second external side and third external side are a rear cabinet side of said cash deposit apparatus.

4. A cash deposit apparatus as defined in claim 1, wherein the service interface includes a lockable cabinet generally preventing access to interior elements of said cash processing module but permitting access to the interior elements by a service person.

5. A cash deposit apparatus as defined in claim 4, the service interface providing access from said rear cabinet side, wherein the service interface further comprises a service user interface comprising at least one of a visual output device, a printer and an input device.

6. A cash deposit apparatus as defined in claim 5, wherein the service interface comprises an indicator adapted to indicate to said service person whether there is an ongoing cash processing transaction in the cash processing module.

7. A cash deposit apparatus as defined in claim 4, further comprising an automatic mode switch for detecting opening of said lockable cabinet and for switching a mode of the user interface of the apparatus from a current mode to a service mode.

8. A cash deposit apparatus as defined in claim 7, wherein said automatic mode switch is adapted for detecting an ongoing cash processing transaction in the cash processing module and delaying the switching to the service mode until the ongoing cash processing transaction has reached completion or a predefined stage.

9. A cash deposit apparatus as defined in claim 4, said cash processing module having internal supports for repositionable mounting of said internal elements inside said cash processing module, such that at least one of said internal elements is repositionable from a first operating position to a second operating position to allow reconfiguration of said cash deposit apparatus from the first cash processing module configuration to the second cash processing module configuration.

10. A cash deposit apparatus as defined in claim 9, wherein said at least one of said internal elements is selected from the group consisting of a cash preprocessor, a cash acceptance module, and a transaction value registering unit.

11. A cash deposit apparatus as defined in claim 1, wherein the cash storage interface includes a lockable cabinet generally preventing access to interior elements of said cash storage chamber but permitting access for a person authorized to remove cash from said cash storage chamber.

12. The cash deposit apparatus according to claim 1, further comprising a controller and a network interface for connection to a network, wherein said controller is adapted to execute web server software, allowing a remote user to interact with said cash deposit apparatus over said network using a remote client.

13. The cash deposit apparatus according to claim 12, further being adapted to allow said remote user to configure parameters controlling an operation of said cash deposit apparatus.

14. The cash deposit apparatus according to claim 12, further being adapted to allow said remote user to retrieve operational information of said cash deposit apparatus.

15. The cash deposit apparatus according to claim 1, further comprising an input device and a display, said cash deposit apparatus being operable in a plurality of languages, wherein an operating language is selectable by an user among said plurality of languages.

16. The cash deposit apparatus according to claim 15, wherein a default language is used if said user fails to select an operating language.

17. The cash deposit apparatus as claimed in claim 16, wherein the lockable service door is provided on a front side of the apparatus.

18. A cash deposit apparatus comprising:

a user interface module presenting a user interface and having an end-user mode for allowing a cash deposit user interaction, and a service mode for service operations;

a cash processing module adapted to process deposited cash and to determine a value related to the processed cash, the cash processing module having a lockable service door requiring a first authorization to permit access to an interior of the cash processing module;

a cash storage module for storing cash as processed by the cash processing module, the cash storage module having a lockable cash storage door requiring a second authorization to permit access to an interior of the cash storage module; and a switch arranged to detect opening of the service door, wherein the user interface is arranged to enter the service mode automatically in response to the switch detecting opening of the service door, and wherein the switch is adapted to detect an ongoing cash processing transaction in the cash processing module and automatically delay the switching to the service mode until the ongoing cash processing transaction has reached completion.

19. The cash deposit apparatus as claimed in claim 18, wherein in the service mode, the user interface is arranged to present a status of the cash processing module.

20. The cash deposit apparatus as claimed in claim 18, wherein the service door is provided on a rear side of the apparatus.

21. The cash deposit apparatus as claimed in claim 20, wherein the service user interface is provided on said rear side.

22. The cash deposit apparatus as claimed in claim 21, wherein the service user interface has an indicator adapted to indicate an ongoing cash processing transaction in the cash processing module.

23. The cash deposit apparatus as claimed in claim 18, wherein the cash storage door comprises a cash storage user interface for cash collecting interaction.

24. The cash deposit apparatus as claimed in claim 18, wherein the cash storage door is provided on a rear side of the apparatus.

25. The cash deposit apparatus according to claim 18, further comprising a controller and a network interface for connection to a network, wherein said controller is adapted to executed web server software, allowing a remote user to interact with said cash deposit apparatus over said network using a remote client.

26. The cash deposit apparatus according to claim 25, further being adopted to allow said remote user to configure parameters controlling an operation of said cash deposit apparatus.

27. The cash deposit apparatus according to claim 25, further being adapted to allow said remote user to retrieve operational information of said cash deposit apparatus.

28. The cash deposit apparatus according to claim 18, further comprising an input device and a display, said cash deposit apparatus being operable in a plurality of languages, wherein an operating language is selectable by an user among said plurality of languages.

29. The cash deposit apparatus to claim 28, wherein a default language is used if said user fails to select an operating language.

* * * * *